United States Patent
Sasaki et al.

(10) Patent No.: US 12,328,040 B2
(45) Date of Patent: Jun. 10, 2025

(54) METHOD OF PRODUCING IRON CORE PRODUCT AND APPARATUS FOR PRODUCING IRON CORE PRODUCT

(71) Applicant: Mitsui High-tec, Inc., Kitakyushu (JP)

(72) Inventors: Hidemi Sasaki, Kitakyushu (JP); Takashi Nishida, Kitakyushu (JP)

(*) Notice: Subject to any disclaimer, the term of this patent is extended or adjusted under 35 U.S.C. 154(b) by 219 days.

(21) Appl. No.: 17/820,597

(22) Filed: Aug. 18, 2022

(65) Prior Publication Data
US 2022/0399789 A1 Dec. 15, 2022

Related U.S. Application Data

(63) Continuation of application No. PCT/JP2020/009477, filed on Mar. 5, 2020.

(51) Int. Cl.
| | |
|---|---|
| B29C 45/14 | (2006.01) |
| B29C 45/72 | (2006.01) |
| B29C 45/76 | (2006.01) |
| B29K 705/12 | (2006.01) |
| B29L 31/00 | (2006.01) |
| H02K 15/02 | (2025.01) |

(52) U.S. Cl.
CPC ....... *H02K 15/02* (2013.01); *B29C 45/14344* (2013.01); *B29C 45/72* (2013.01); *B29C 45/76* (2013.01); *B29C 2945/761* (2013.01); *B29C 2945/7613* (2013.01); *B29C 2945/76287* (2013.01); *B29K 2705/12* (2013.01); *B29K 2995/0008* (2013.01); *B29L 2031/7498* (2013.01)

(58) Field of Classification Search
CPC ............................................. B29C 45/14344
See application file for complete search history.

(56) References Cited

U.S. PATENT DOCUMENTS

| | | | |
|---|---|---|---|
| 2011/0179633 A1* | 7/2011 | Amano | B29C 45/14778 29/598 |
| 2016/0056694 A1* | 2/2016 | Mabu | H02K 15/12 29/598 |
| 2017/0012507 A1* | 1/2017 | Sasaki | B23K 37/0435 |
| 2019/0089231 A1* | 3/2019 | Ishimatsu | H01F 41/005 |
| 2020/0099278 A1* | 3/2020 | Fukuyama | B29C 45/14467 |

FOREIGN PATENT DOCUMENTS

| | | |
|---|---|---|
| JP | 2016-046818 | 4/2016 |
| WO | 2015/053368 | 4/2015 |
| WO | 2017/179547 | 10/2017 |

OTHER PUBLICATIONS

International Search Report dated Jun. 2, 2020 for PCT/JP2020/009477.
International Preliminary Report on Patentability with Written Opinion dated Sep. 15, 2022 for PCT/JP2020/009477.

* cited by examiner

*Primary Examiner* — Virak Nguon
(74) *Attorney, Agent, or Firm* — SOEI PATENT & LAW FIRM

(57) ABSTRACT

A method of producing an iron core product may include: substantially simultaneously putting resin materials into each of a plurality of first accommodating portions formed in a heating portion; substantially simultaneously initiating heating, by the heating portion, of the resin materials disposed in the first accommodating portions; and supplying a molten resin from the first accommodating portions to resin forming regions provided in a core body.

18 Claims, 18 Drawing Sheets

METHOD OF PRODUCING IRON CORE PRODUCT AND APPARATUS FOR PRODUCING IRON CORE PRODUCT

CROSS-REFERENCE TO RELATED APPLICATIONS

This application is a continuation application of PCT Application No. PCT/JP2020/009477 filed on Mar. 5, 2020, the entire contents of which are incorporated herein by reference.

BACKGROUND

International Publication WO 2015/053368 discloses a resin molding method including accommodating a magnet in a magnet accommodating hole of a motor core, sandwiching the motor core with molds, and pressure-feeding a mold resin to the magnet accommodating hole to mold the magnet in the magnet accommodating hole with a resin.

SUMMARY

An example method of producing an iron core product may include: substantially simultaneously putting resin materials into each of a plurality of first accommodating portions formed in a heating portion; substantially simultaneously initiating heating, by a temperature rise in heating portion, of the resin materials disposed in the first accommodating portions; and supplying a molten resin from the first accommodating portions to resin forming regions provided in a core body.

DETAILED DESCRIPTION

Figure 1:
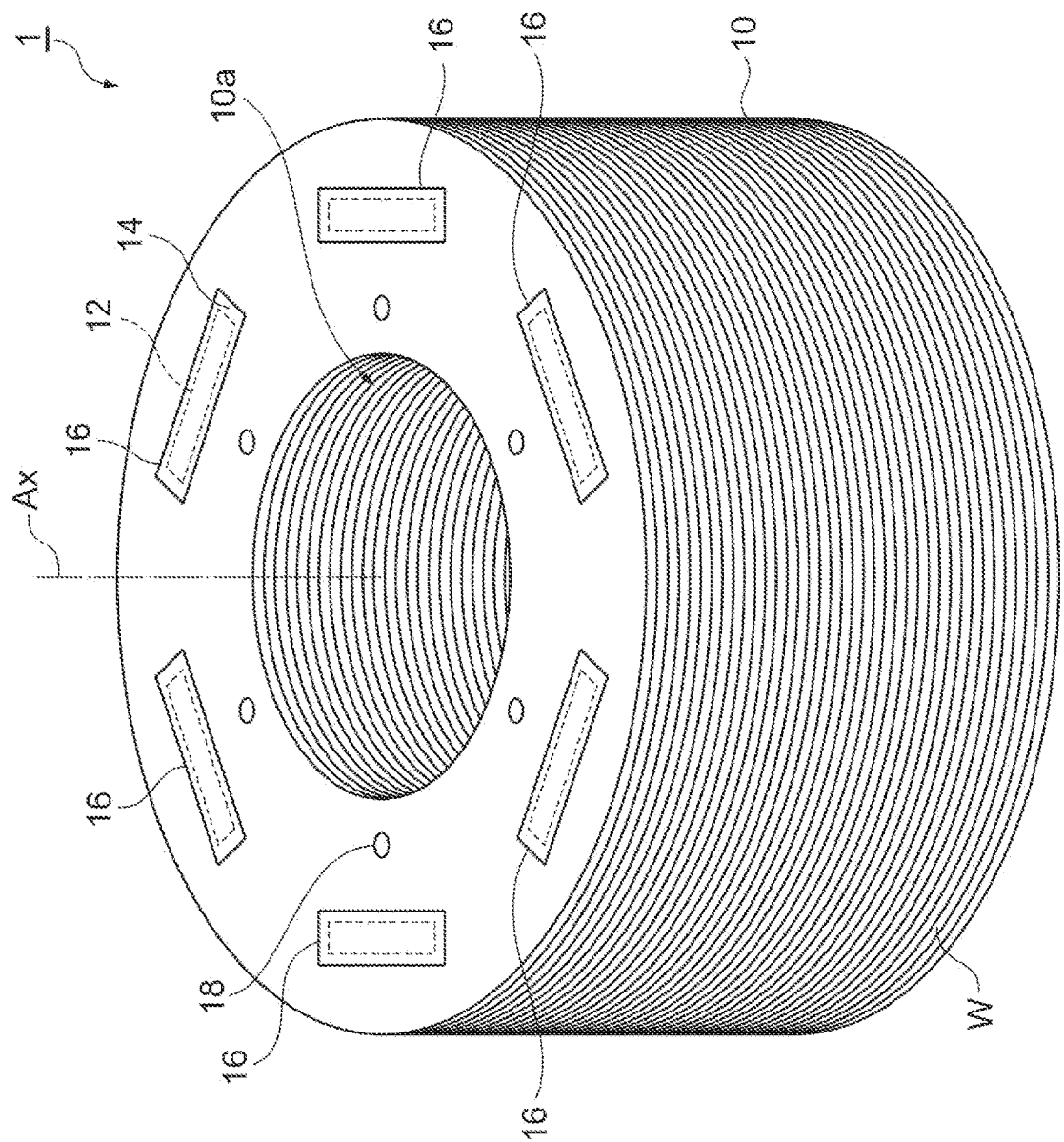
FIG. 1 is a perspective view illustrating an example stacked rotor core.

In the following description, the same reference numerals will be used for the same or functionally identical elements with redundant description omitted.

Stacked Rotor Core

First, the configuration of a stacked rotor core 1 (iron core product) will be described with reference to FIG. 1. The stacked rotor core 1 is a part of a rotor. The rotor is configured by attaching a shaft (not illustrated) to the stacked rotor core 1. An electric motor (motor) is configured by combining the rotor with a stator. The stacked rotor core 1 may configure a part of an interior permanent magnet-type (IPM) motor or may configure a part of another type of motor.

The stacked rotor core 1 includes a stack 10 (core body), a plurality of permanent magnets 12, and a plurality of solidified resins 14.

The stack 10 has a cylindrical shape. A shaft hole 10a penetrating the stack 10 is provided in the middle portion of the stack 10 so as to extend along a central axis Ax. The shaft hole 10a extends in the height direction (up-down direction) of the stack 10. The stack 10 rotates around the central axis Ax, and thus the central axis Ax is also an axis of rotation. A shaft is inserted through the shaft hole 10a.

A plurality of magnet insertion holes 16 (resin forming regions) are formed in the stack 10. The magnet insertion holes 16 are arranged at predetermined intervals along the outer peripheral edge of the stack 10. The number of the plurality of magnet insertion holes 16 formed in the stack 10 may be three or more. The three or more magnet insertion holes 16 as a whole may have an annular shape or may have a circular ring shape when viewed from above. Each magnet insertion hole 16 penetrates the stack 10 so as to extend along the central axis Ax. In other words, each magnet insertion hole 16 extends in the height direction.

The stack 10 is configured by stacking a plurality of blanked members W. The blanked member W is a plate-shaped body obtained by blanking a metal plate MS (for example, an electromagnetic steel plate), which will be described later, into a predetermined shape and has a shape corresponding to the stack 10. The blanked members W that are adjacent to each other in the height direction may be fastened by a caulking portion 18 (see FIG. 1), may be bonded by an adhesive, or may be joined by welding.

The stack 10 may be configured by so-called rotational stack or skewing. The "rotational stack" means stacking the plurality of blanked members W while relatively shifting the angles of the blanked members W. The rotational stack is performed mainly for the purpose of offsetting the plate thickness deviation of the blanked members W and increasing the flatness, parallelism, and squareness of the stack 10. The "skewing" means stacking the plurality of blanked members W so as to have a twist angle with respect to the central axis Ax. The skewing is performed for the purpose of reducing cogging torque, torque ripple, and the like. The angle of the rotational stack or skewing may be set to any size.

One permanent magnet 12 may be inserted in each magnet insertion hole 16. The shape of the permanent magnet 12 is not particularly limited, and the shape may be, for example, a rectangular parallelepiped shape. The type of the permanent magnet 12 may be determined in accordance with the application of a motor, the required performance, or the like, and the permanent magnet 12 may be, for example, a sintered magnet or a bonded magnet.

The solidified resin 14 is a solidified molten resin material (molten resin) with which the magnet insertion hole 16 where the permanent magnet 12 is disposed is filled. The solidified resin 14 may be configured to fix the permanent magnet 12 in the magnet insertion hole 16. The solidified resin 14 may be configured to bond the blanked members W that are adjacent to each other in the up-down direction. Examples of the resin material by which the solidified resin 14 is configured include a thermosetting resin and a thermoplastic resin. Specific examples of the thermosetting resin include a resin composition containing an epoxy resin, a curing initiator, and an additive. Examples of the additive include a filler, a flame retardant, and a stress-reducing agent.

Apparatus for Producing Stacked Rotor Core

Figure 2:
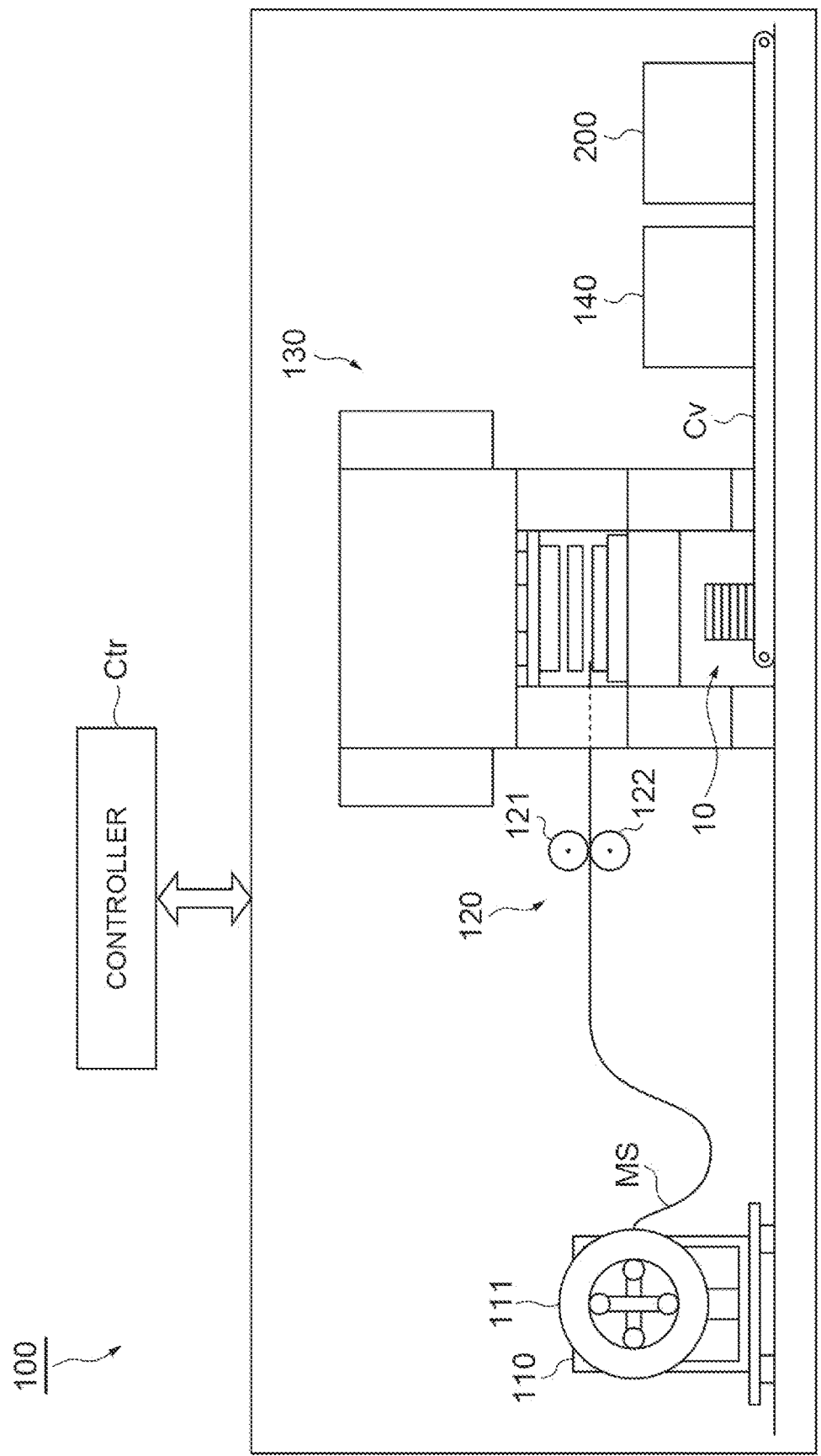
FIG. 2 is a schematic diagram illustrating an example apparatus for producing a stacked rotor core.

Next, an apparatus 100 for producing the stacked rotor core 1 will be described with reference to FIG. 2. The production apparatus 100 is configured to produce the stacked rotor core 1 from the belt-like metal plate MS. The production apparatus 100 includes an uncoiler 110, a feeding device 120, a blanking device 130, a magnet attachment device 140, a resin filling system 200, and a controller Ctr (determination unit).

The uncoiler 110 is configured to rotatably hold a coil material 111. The coil material 111 is the metal plate MS that is wound in a coil shape (spiral shape). The feeding device 120 includes a pair of rollers 121 and 122 sandwiching the metal plate MS from above and below The pair of rollers 121 and 122 are configured to rotate and stop based on an instruction signal from the controller Ctr and intermittently and sequentially send out the metal plate MS toward the blanking device 130.

The blanking device 130 operates based on an instruction signal from the controller Ctr. The blanking device 130 is configured to sequentially blank the metal plate MS intermittently sent out by the feeding device 120 to form the blanked member W. The blanking device 130 is configured to sequentially stack the plurality of blanked members W obtained as a result of the blanking to form the stack 10. The stack 10 formed by the blanking device 130 may be transported to the magnet attachment device 140 by, for example, a conveyor Cv1 or may be manually transported to the magnet attachment device 140.

The magnet attachment device 140 operates based on an instruction signal from the controller Ctr. The magnet attachment device 140 is configured to dispose one permanent magnet 12 in each magnet insertion hole 16. The magnet attachment device 140 may be, for example, a robot hand.

Figure 9:
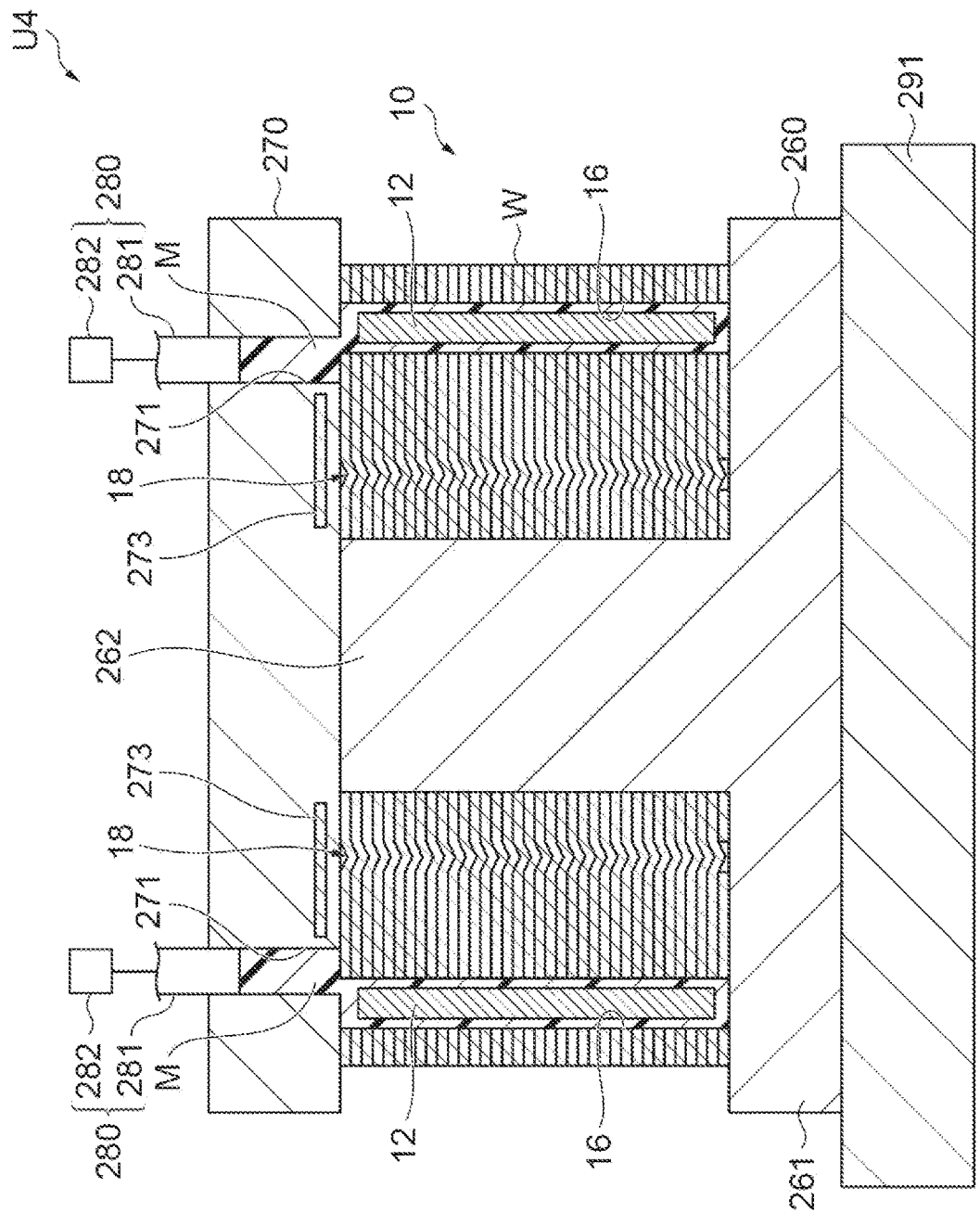
FIG. 9 is a cross-sectional view schematically illustrating an example resin filling system.

The resin filling system 200 is configured such that the magnet insertion hole 16 where the permanent magnet 12 is disposed is filled with a molten resin M (see FIG. 9). Details of the resin filling system 200 will be described later.

The controller Ctr is configured to generate respective signals for operating the feeding device 120, the blanking device 130, the magnet attachment device 140, and the resin filling system 200 based on, for example, a program recorded on a recording medium (not illustrated) or an operation input from an operator. The controller Ctr is configured to transmit the generated signals to the feeding device 120, the blanking device 130, the magnet attachment device 140, and the resin filling system 200, respectively.

Resin Filling System

Next, the configuration of the resin filling system 200 will be described with reference to FIGS. 3 to 9. As illustrated in FIGS. 3 to 9, the resin filling system 200 includes a material supply unit U1, a disposition unit U2, a transport unit U3, and a heating unit U4.

Figure 3:
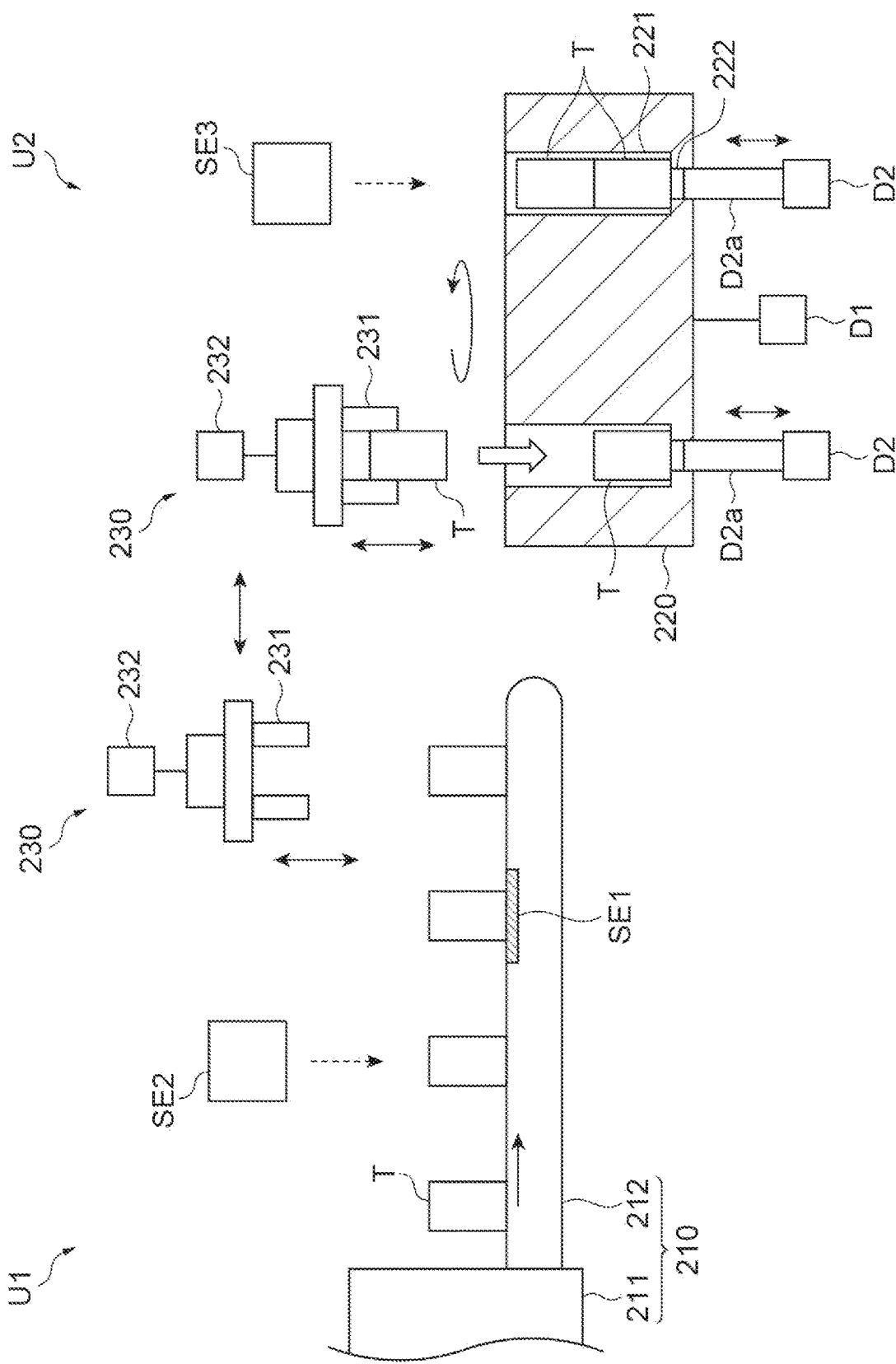
FIG. 3 is a schematic diagram partially illustrating an example resin filling system.

As illustrated in FIG. 3, the material supply unit U1 includes a material feeder 210, a weight sensor SE1 (second measuring machine), and a height sensor SE2 (second measuring machine). The material feeder 210 includes an alignment mechanism 211 and a transport mechanism 212.

The alignment mechanism 211 is configured to operate based on an instruction from the controller Ctr. The alignment mechanism 211 is configured to store a plurality of resin tablets T (resin materials). The alignment mechanism 211 is configured to send out the resin tablets T one by one to the transport mechanism 212 while adjusting the individual resin tablets T to a predetermined posture. The alignment mechanism 211 may be configured to send out two or more resin tablets T as a set to the transport mechanism 212.

The transport mechanism 212 is configured to operate based on an instruction from the controller Ctr. The transport mechanism 212 extends from the alignment mechanism 211 toward the disposition unit U2. The transport mechanism 212 is configured to sequentially transport the resin tablets T sent out one by one from the alignment mechanism 211 toward the disposition unit U2. Accordingly, in the transport mechanism 212, the plurality of resin tablets T are arranged in a row. In the transport mechanism 212, the plurality of resin tablets T may be arranged in two or more rows.

The weight sensor SE1 is configured to measure the individual weights of the resin tablets T. Data on the weights measured by the weight sensor SE1 is transmitted to the controller Ctr. The weight sensor SE1 may be configured to be built in the transport mechanism 212 and measure the weight of the resin tablet T passing through the transport mechanism 212. The weight sensor SE1 may be configured to be separate from the transport mechanism 212 and measure the weight of the resin tablet T transferred by a gripping mechanism 230 (described later) or the like.

The height sensor SE2 is configured to measure the individual heights of the resin tablets T. The height sensor SE2 may be a non-contact sensor or a contact sensor. Data on the heights measured by the height sensor SE2 is transmitted to the controller Ctr. The height sensor SE2 may be configured to be disposed above the transport mechanism 212 and measure the height of the resin tablet T passing through the transport mechanism 212. The height sensor SE2 may be configured to measure the height of the resin tablet T at a place different from the transport mechanism 212.

Figure 4:
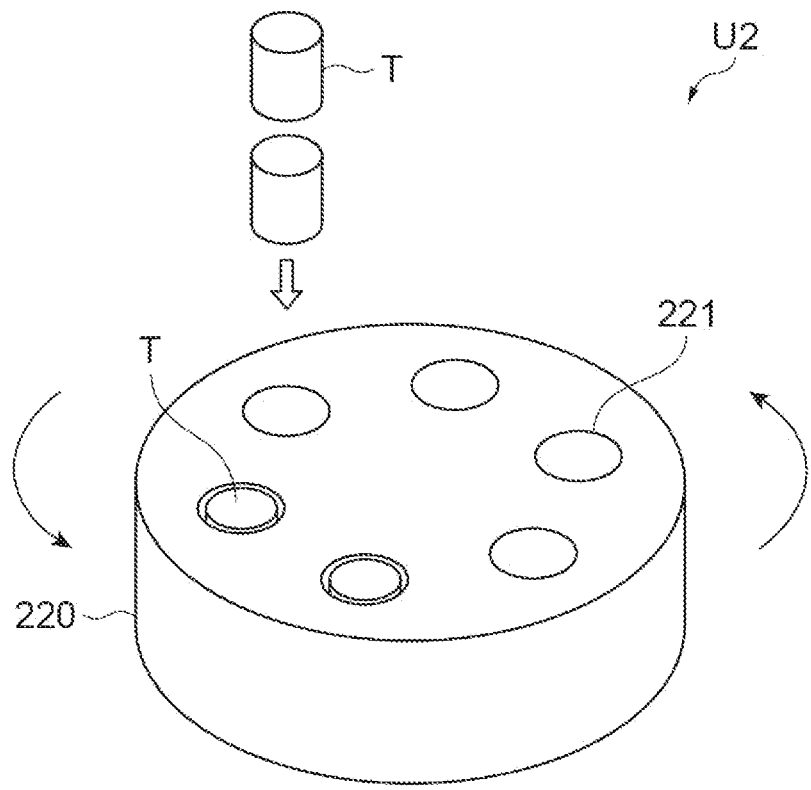
FIG. 4 is a perspective view illustrating an example disposition portion.

As illustrated in FIGS. 3 and 4, the disposition unit U2 includes a disposition portion 220, the gripping mechanism 230, a height sensor SE3 (first measuring machine), a drive source D1, and lifting-lowering mechanisms D2.

The disposition portion 220 is configured to hold a predetermined number of resin tablets T at a predetermined position. The disposition portion 220 includes a plurality of accommodating holes 221 (third accommodating portions) and a plurality of insertion holes 222.

Each of the plurality of accommodating holes 221 is configured to be capable of accommodating at least one resin tablet T. In a case where a plurality of the resin tablets T are accommodated in one accommodating hole 221, the plurality of resin tablets T may be arranged in a row in the accommodating hole 221 in the extension direction of the accommodating hole 221 (see FIG. 3).

The plurality of accommodating holes 221 are formed in the disposition portion 220 so as to extend in the height direction of the disposition portion 220. The plurality of accommodating holes 221 may, for example, extend from the upper end surface of the disposition portion 220 to the lower portion of the disposition portion 220. The length of the plurality of accommodating holes 221 may be set in accordance with, for example, the number of the resin tablets T to be accommodated.

As illustrated in FIG. 4, the plurality of accommodating holes 221 are positioned so as to be annular when viewed from above. The plurality of accommodating holes 221 may be positioned so as to be circular ring-shaped when viewed from above.

The plurality of insertion holes 222 include the same number of insertion holes 222 as the plurality of accommodating holes 221. Each insertion hole 222 extends in the height direction so as to communicate with the corresponding accommodating hole 221. Each insertion hole 222 may, for example, extend from the lower end surface of the disposition portion 220 to the corresponding accommodating hole 221. The opening area of each insertion hole 222 is set to be smaller than the opening area of the corresponding accommodating hole 221. Accordingly, the resin tablet T disposed in the accommodating hole 221 is prevented from falling from the insertion hole 222.

As illustrated in FIG. 3, the gripping mechanism 230 is configured to grip one resin tablet T and transfer the resin tablet T from the material supply unit U1 to the disposition unit U2. The gripping mechanism 230 may be configured to simultaneously grip two or more resin tablets T and transfer the resin tablets T from the material supply unit U1 to the disposition unit U2. The gripping mechanism 230 includes a gripping jig 231 and a drive source 232.

The gripping jig 231 is configured to be capable of gripping the resin tablet T. The gripping jig 231 may be configured by, for example, a plurality of chuck claws. The resin tablet T may be gripped by the plurality of chuck claws when the plurality of chuck claws are close to each other. The plurality of chuck claws may release the resin tablet T when the plurality of chuck claws are separated from each other.

The drive source 232 is configured to operate based on an instruction from the controller Ctr. The drive source 232 is configured to drive the gripping jig 231 so that the gripping jig 231 grips or releases the resin tablet T. The drive source 232 is configured to move the gripping jig 231 horizontally and/or vertically between the material supply unit U1 and the disposition unit U2.

The height sensor SE3 is configured to measure the height of the resin tablet T accommodated in each accommodating hole 221. The height sensor SE3 may be a non-contact sensor or a contact sensor. Data on the height measured by the height sensor SE3 is transmitted to the controller Ctr. The height sensor SE3 may be disposed above the disposition portion 220.

The drive source D1 is configured to operate based on an instruction from the controller Ctr. The drive source D1 is configured to rotate the disposition portion 220 around the central axis extending along the vertical direction. The drive source D1 may be, for example, a rotary motor.

The plurality of lifting-lowering mechanisms D2 are configured to operate based on an instruction from the controller Ctr. The plurality of lifting-lowering mechanisms D2 are configured to be expandable and contractible in the up-down direction. The plurality of lifting-lowering mechanisms D2 may be, for example, lifting-lowering cylinders. The tip portion of each lifting-lowering mechanism D2 can be inserted through the corresponding accommodating hole 221 and insertion hole 222. Accordingly, when a tip portion D2a of the lifting-lowering mechanism D2 rises with the resin tablet T accommodated in the accommodating hole 221, the tip portion D2a pushes up the resin tablet T out of the accommodating hole 221.

Figure 5:
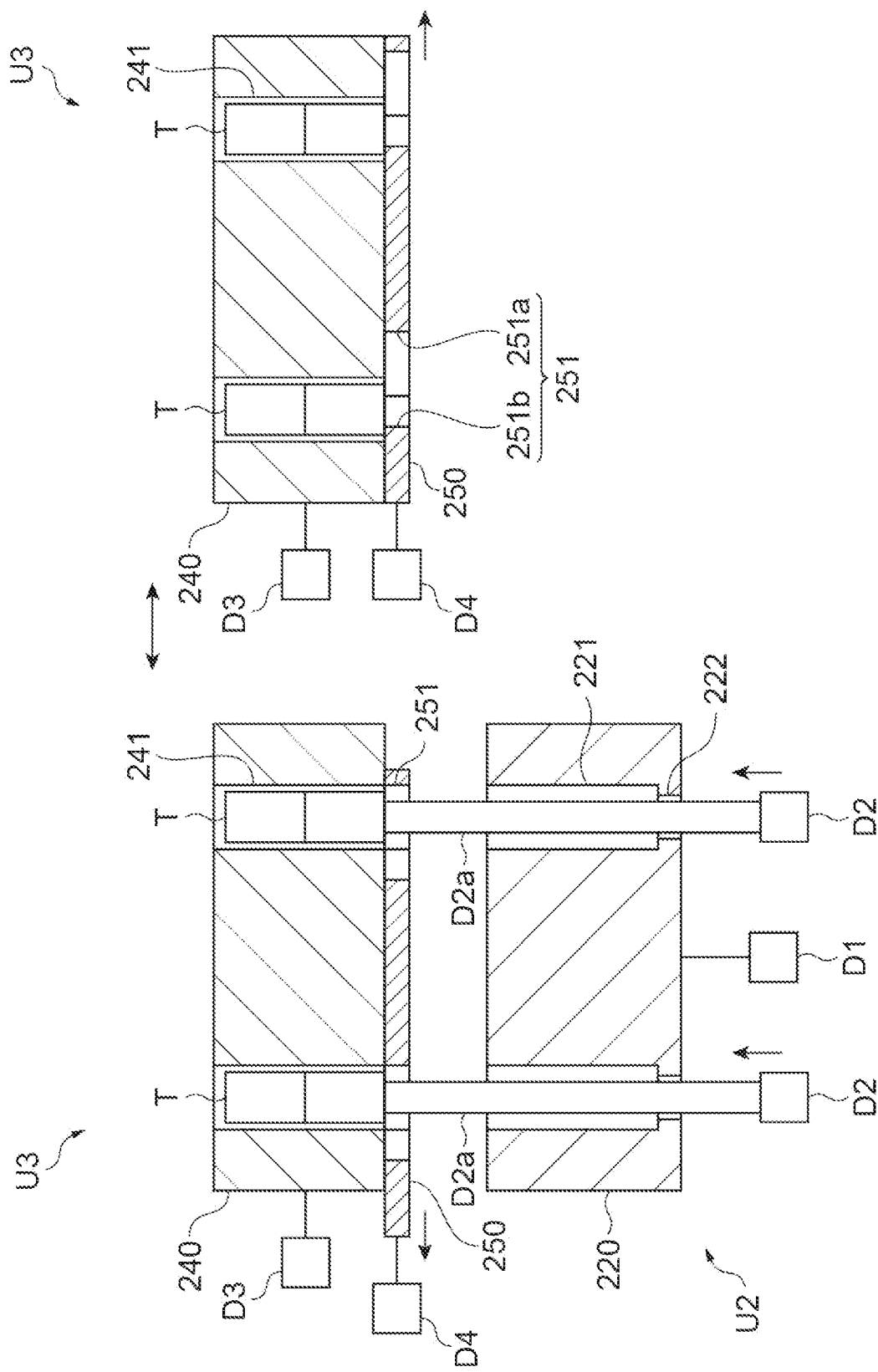
FIG. 5 is a schematic diagram partially illustrating an example resin filling system.
Figure 6:
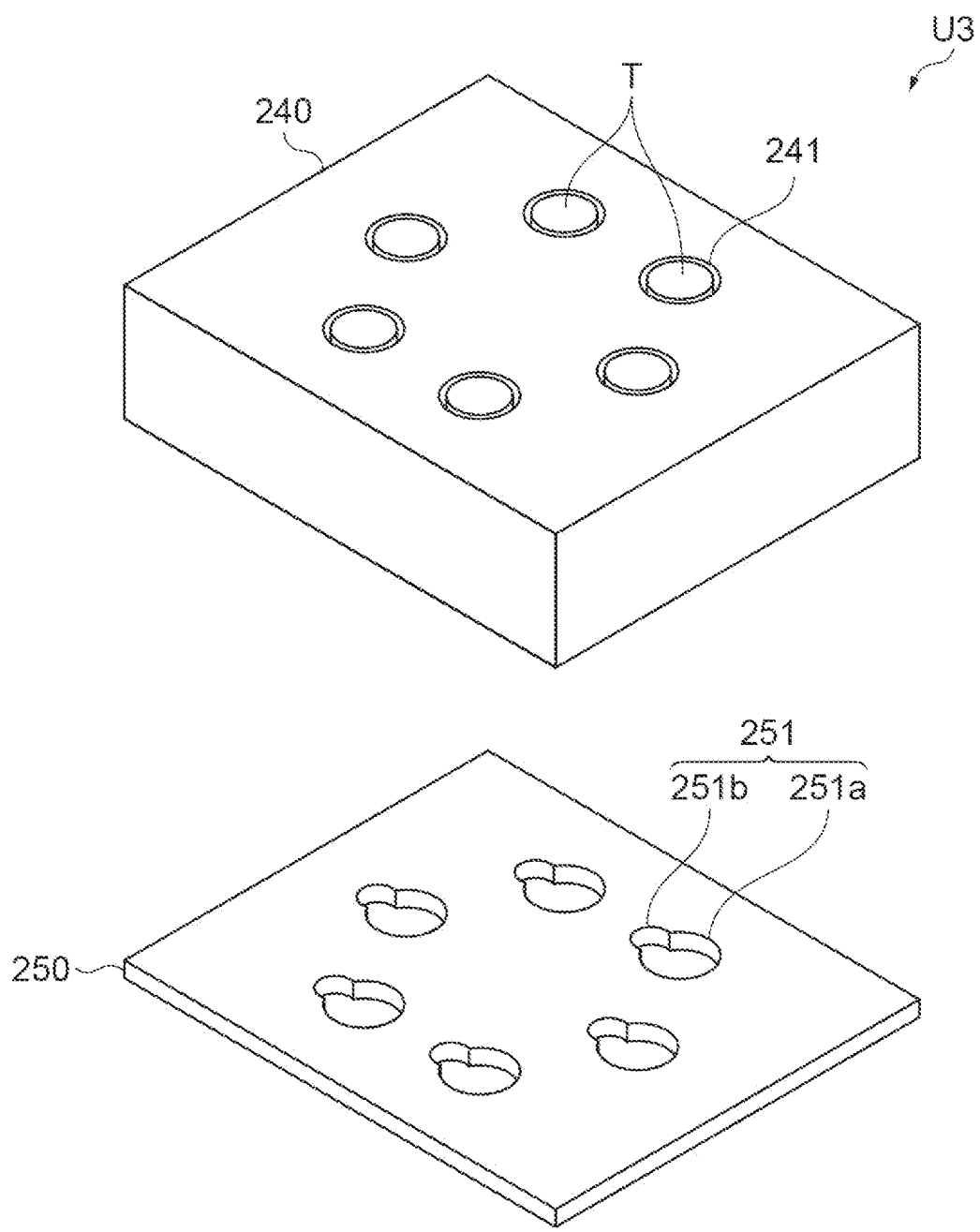
FIG. 6 is an exploded perspective view illustrating an example transport portion.

As illustrated in FIGS. 5 and 6, the transport unit U3 includes a transport portion 240 (input machine), an opening-closing member 250 (input machine), a drive source D3, and a drive source D4.

The transport portion 240 is configured to hold a predetermined number of resin tablets T at a predetermined position. The transport portion 240 includes a plurality of accommodating holes 241 (second accommodating portions).

Each of the plurality of accommodating holes 241 is configured to be capable of accommodating at least one resin tablet T. In a case where a plurality of the resin tablets T are accommodated in one accommodating hole 241, the plurality of resin tablets T may be arranged in a row in the accommodating hole 241 in the extension direction of the accommodating hole 241 (see FIG. 5).

The plurality of accommodating holes 241 are formed in the transport portion 240 so as to extend in the height direction of the transport portion 240. The plurality of accommodating holes 241 may, for example, extend from the upper end surface to the lower end surface of the transport portion 240. The plurality of accommodating holes 241 may be through holes penetrating the transport portion 240 in the height direction. The length of the plurality of accommodating holes 241 may be set in accordance with, for example, the number of the resin tablets T to be accommodated.

As illustrated in FIG. 6, the plurality of accommodating holes 241 are positioned so as to be annular when viewed from above. The plurality of accommodating holes 241 may be positioned so as to be circular ring-shaped when viewed from above. The plurality of accommodating holes 241 may be equal in number to the plurality of accommodating holes 221. In this case, the plurality of accommodating holes 241 may be positioned so as to overlap the plurality of accommodating holes 221 when viewed from above.

As illustrated in FIGS. 5 and 6, the opening-closing member 250 is disposed in the bottom portion of the transport portion 240 so as to be horizontally movable with respect to the lower surface of the transport portion 240. The opening-closing member 250 includes a plurality of through holes 251 as illustrated in FIG. 5.

The plurality of through holes 251 are formed in the opening-closing member 250 so as to extend in the height direction of the opening-closing member 250. The plurality of through holes 251 penetrate the opening-closing member 250 in the height direction. The plurality of through holes 251 are positioned so as to be annular when viewed from above. The plurality of through holes 251 may be positioned so as to be circular ring-shaped when viewed from above.

The plurality of through holes 251 may be equal in number to the plurality of accommodating holes 241. Each through hole 251 may include a first part 251a and a second part 251b as illustrated in FIGS. 5 and 6. The opening area of the first part 251a may be set to an opening area at which the resin tablet T is capable of passing. The opening area of the second part 251b may be set to an opening area at which the tip portion D2a of the lifting-lowering mechanism D2 is capable of passing. The opening area of the second part 251b is smaller than the area of the bottom surface of the resin tablet T.

The drive source D3 is configured to operate based on an instruction from the controller Ctr. As illustrated in FIG. 5, the drive source D3 is configured to move the transport portion 240 and the opening-closing member 250 horizontally and/or vertically between the disposition unit U2 and the heating unit U4. The drive source D3 may be, for example, a linear actuator.

The drive source D4 is configured to operate based on an instruction from the controller Ctr. The drive source D4 is configured to slide the opening-closing member 250 along the horizontal direction. The drive source D4 may be, for example, configured to move the opening-closing member 250 between a first position where most of the first part 251a substantially matches the accommodating hole 241 when viewed from above and a second position where mainly the second part 251b overlaps the accommodating hole 241 when viewed from above.

As illustrated in FIG. 5, when the opening-closing member 250 is at the first position, the resin tablet T is capable of moving from the accommodating hole 221 to the accommodating hole 241 through the first part 251a. When the opening-closing member 250 is at the second position, the tip portion D2a of the lifting-lowering mechanism D2 is capable of passing through the second part 251b although the resin tablet T disposed in the accommodating hole 241 is prevented from falling from the through hole 251.

Figure 7:
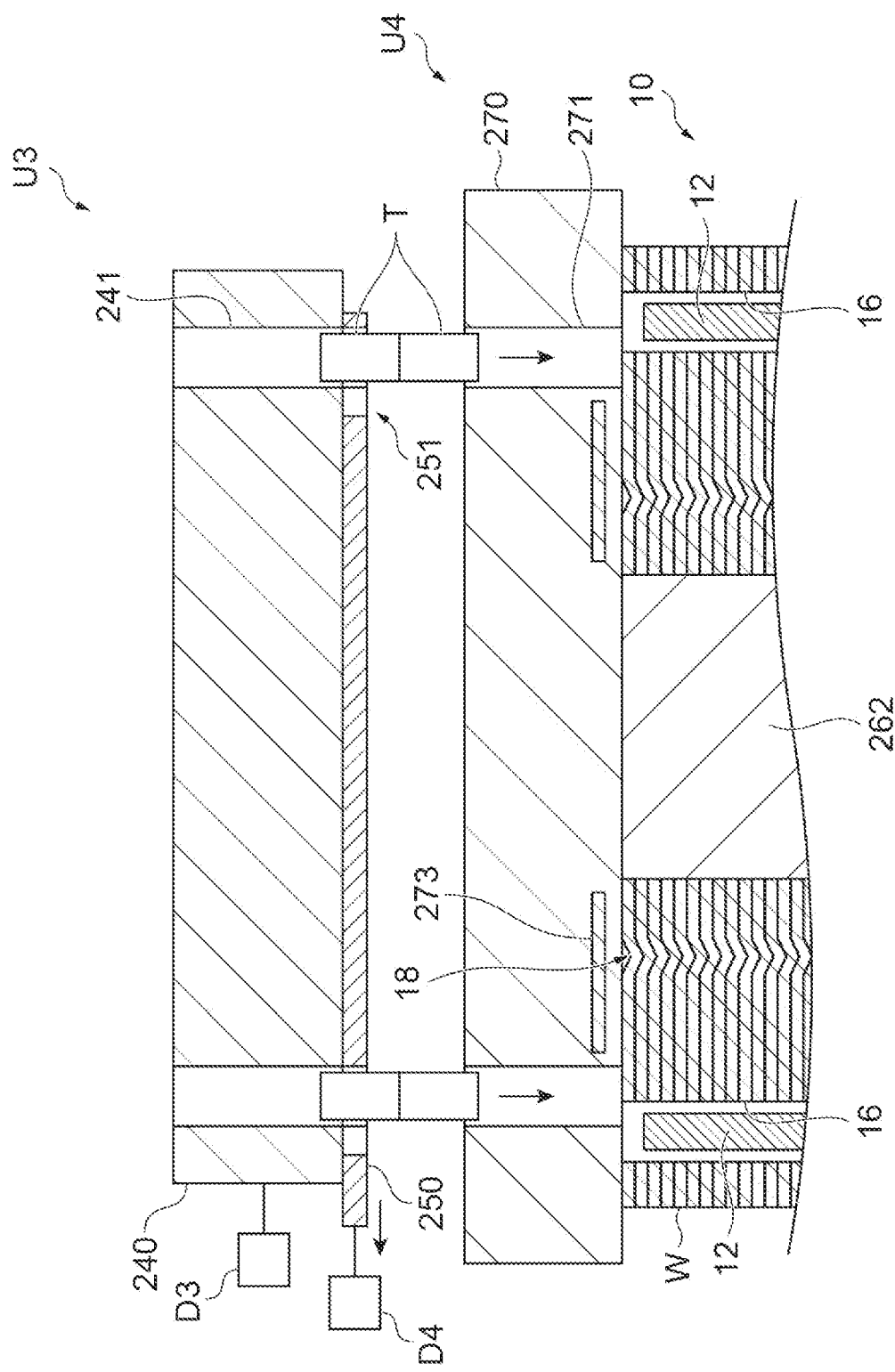
FIG. 7 is a schematic diagram partially illustrating an example resin filling system.
Figure 8:
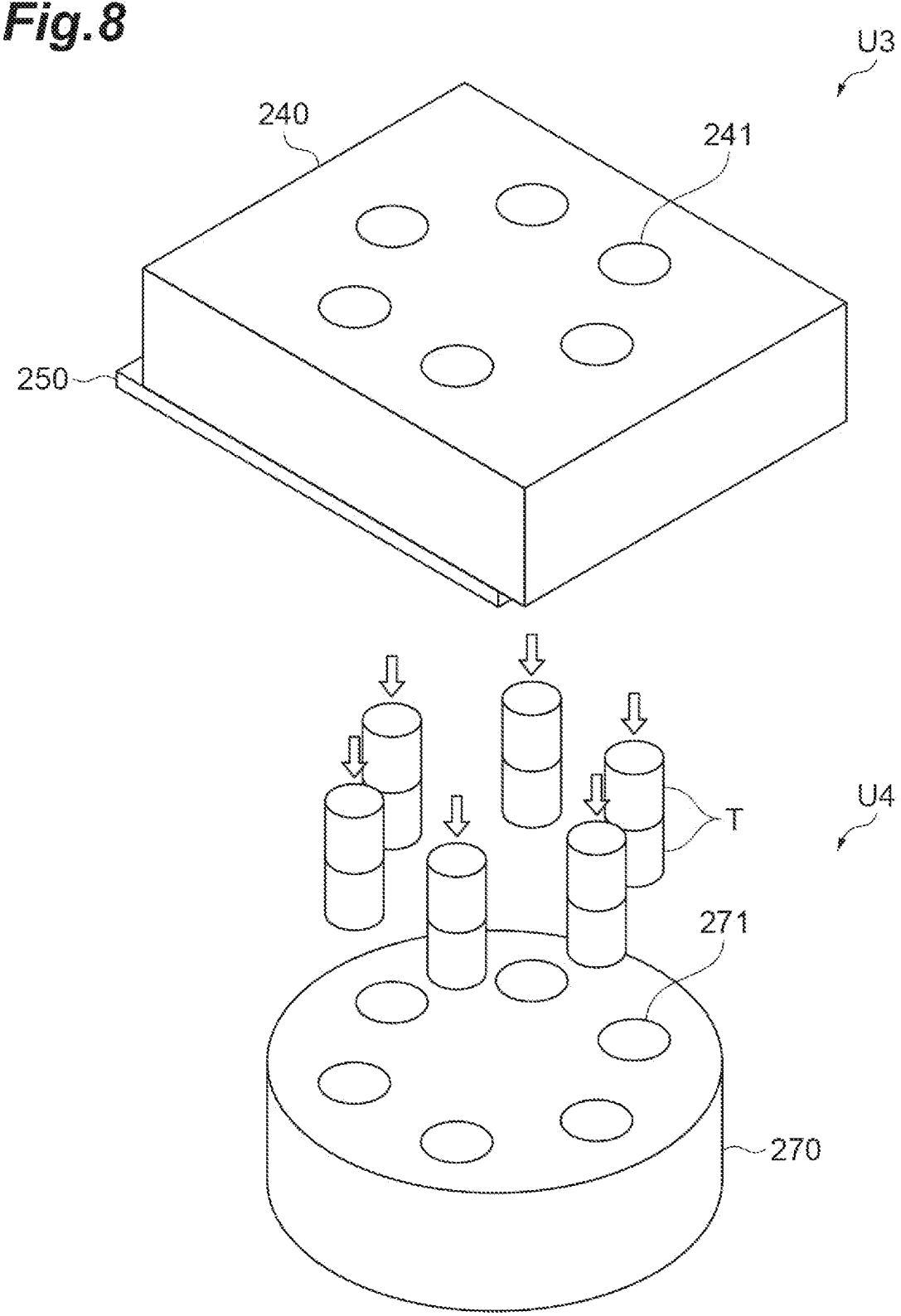
FIG. 8 is a perspective view illustrating an example transport portion and an example heating portion.

The heating unit U4 is configured such that the magnet insertion hole 16 through which the permanent magnet 12 is inserted is filled with the molten resin M. As illustrated in FIGS. 7 to 9, the heating unit U4 includes a jig 260, a heating mold 270 (heating portion), and a plurality of extrusion mechanisms 280.

As illustrated in FIG. 9, the jig 260 includes a base member 261 and an insertion post 262 provided on the base member 261. The base member 261 is configured such that the stack 10 can be placed. The insertion post 262 is positioned on a substantially middle portion of the base member 261 and protrudes upward from the upper surface of the base member 261. The insertion post 262 has a cylindrical shape and has an outer shape corresponding to the shaft hole 10a of the stack 10.

The heating mold 270 is configured to be capable of sandwiching the stack 10 and the jig 260 in the height direction together with a lower mold 291. The heating mold 270 also functions as an upper mold. When the heating mold 270 and the lower mold 291 sandwich the stack 10 and the jig 260, a predetermined load is applied to the stack 10 from the height direction.

The heating mold 270 includes a plurality of accommodating holes 271 (first accommodating portions). Each of the plurality of accommodating holes 271 is configured to be capable of accommodating at least one resin tablet T. In a case where a plurality of the resin tablets T are accommodated in one accommodating hole 271, the plurality of resin tablets T may be arranged in a row in the accommodating hole 271 in the extension direction of the accommodating hole 271 (see FIGS. 7 and 8).

The plurality of accommodating holes 271 are formed in the heating mold 270 so as to extend in the height direction of the heating mold 270. The plurality of accommodating holes 271 may, for example, extend from the upper end surface to the lower end surface of the heating mold 270. The plurality of accommodating holes 271 may be through holes penetrating the heating mold 270 in the height direction. The length of the plurality of accommodating holes 271 may be set in accordance with, for example, the number of the resin tablets T to be accommodated.

As illustrated in FIG. 8, the plurality of accommodating holes 271 are positioned so as to be annular when viewed from above. The plurality of accommodating holes 271 may be positioned so as to be circular ring-shaped when viewed from above. The plurality of accommodating holes 271 may be equal in number to the plurality of accommodating holes 241. In this case, the plurality of accommodating holes 271 may be positioned so as to overlap the plurality of accommodating holes 241 when viewed from above. When the heating mold 270 and the lower mold 291 sandwich the stack 10 and the jig 260, the accommodating holes 271 may be positioned at parts respectively corresponding to the magnet insertion holes 16 of the stack 10.

The heating mold 270 includes a heater 273 as illustrated in FIGS. 7 and 9. The heater 273 is configured to operate based on an instruction from the controller Ctr. The heater 273 is configured to heat the resin tablet T accommodated in each accommodating hole 271 by heating the heating mold 270. When the resin tablet T is heated by the heater 273, the resin tablet T melts and changes into the molten resin M as illustrated in FIG. 9. The heater 273 may be disposed inside the heating mold 270 or may be disposed outside the heating mold 270.

The plurality of extrusion mechanisms 280 are configured to push out the molten resin M into the magnet insertion holes 16. Each extrusion mechanism 280 includes a plunger 281 and a drive source 282. Each plunger 281 is configured to be insertable from above with respect to the corresponding accommodating hole 271. Each drive source 282 is configured to operate based on an instruction from the controller Ctr. Each drive source 282 is configured to move the corresponding plunger 281 up and down. Accordingly, each plunger 281 may be independently inserted and removed with respect to the corresponding accommodating hole 271 by the corresponding drive source 282. Alternatively, one drive source 282 may operate the plurality of plungers 281 up and down at the same time.

Figure 10:
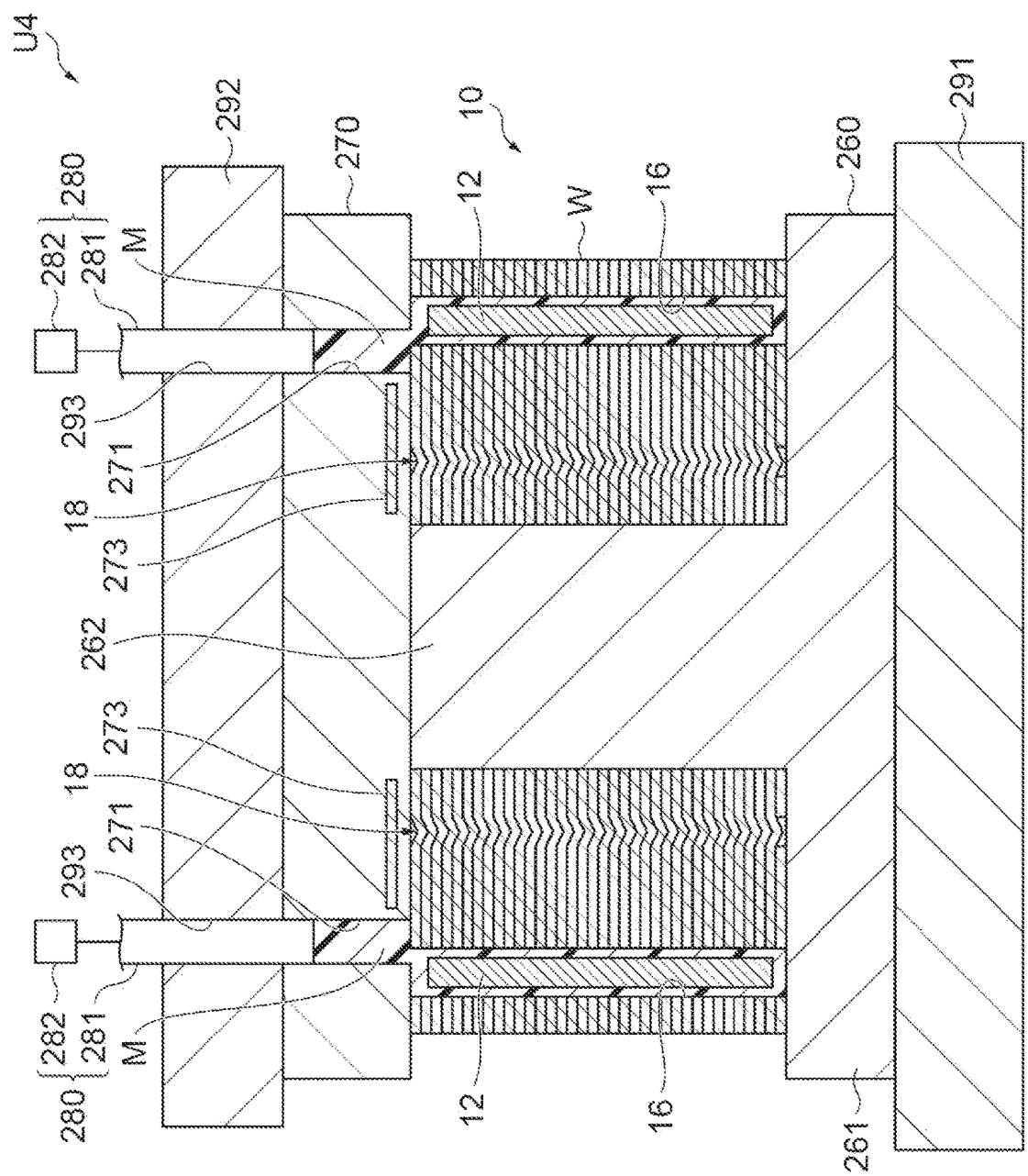
FIG. 10 is a cross-sectional view schematically illustrating another example resin filling system.

Although a case where the heating mold 270 fulfills the function of an upper mold is exemplified here, an upper mold 292 capable of gripping the heating mold 270, the stack 10, and the jig 260 together with the lower mold 291 may be separately provided (see FIG. 10). In this case, a through hole 293 communicating with the accommodating hole 271 may be provided in the upper mold 292 and the extrusion mechanism 280 (plunger 281 and drive source 282) may be provided in each through hole 293.

Method of Producing Stacked Rotor Core

Next, a method of producing the stacked rotor core 1 will be described with reference to FIGS. 3 to 11. Here, the step of forming the stack 10 with the blanking device 130 will not be described and the subsequent steps will be described.

First, the stack 10 that is placed on the jig 260 is transported to the magnet attachment device 140. In other words, as illustrated in FIG. 9 or FIG. 10, the stack 10 is placed on the jig 260 with the insertion post 262 inserted through the shaft hole 10a. Next, the permanent magnets 12 are respectively inserted into the magnet insertion holes 16 (see step S11 in FIG. 11). The permanent magnets 12 may be inserted into the magnet insertion holes 16 manually or, for example, by a robot hand (not illustrated) of the magnet attachment device 140 based on an instruction of the controller Ctr. Subsequently, the stack 10 is transported to the heating unit U4 together with the jig 260 so as to be positioned below the heating mold 270 (for example, such that the upper end surface of the stack 10 is in contact with the lower end surface of the heating mold 270).

Meanwhile, in the resin filling system 200, first, the controller Ctr controls the material feeder 210 and the resin tablets T are sent out to the downstream side by the transport mechanism 212 while being adjusted to a predetermined posture and aligned one by one. When the resin tablets T reach the weight sensor SE1 and the height sensor SE2, the weight sensor SE1 and the height sensor SE2 may measure the weight and height of each resin tablet T and transmit the measurement data to the controller Ctr (see step S12 in FIG. 11).

The controller Ctr may determine whether or not the height and weight of the resin tablet T are within specified ranges based on the measured data. In a case where the height and weight of the resin tablet T are not within the specified ranges, the controller Ctr may control a discharge mechanism (not illustrated) or the like so as to exclude the resin tablet T from the transport mechanism 212 or may issue an alarm to a worker. Whether or not the height of the resin tablet T is within the specified range may be determined by whether or not the height is in the range of −1.5 mm to +1.5 mm with respect to a preset reference height or by whether or not the height is in the range of −1.3 mm to +1.3 mm with respect to the preset reference height. Whether or not the weight of the resin tablet T is within the specified range may be determined by whether or not the weight is in the range of −1.0 g to +1.0 g with respect to a preset reference weight or by whether or not the weight is in the range of −0.7 g to +0.7 g with respect to the preset reference weight.

When the resin tablet T reaches the downstream end of the transport mechanism 212, the controller Ctr controls the drive source 232 and the resin tablet T is gripped by the gripping jig 231. Next, the controller Ctr controls the drive source 232 to move the gripping jig 231 such that the gripping jig 231 is positioned above the predetermined accommodating hole 221 of the disposition portion 220. Next, the controller Ctr controls the drive source 232 to release the resin tablet T from the gripping jig 231. In this manner, the resin tablet T is accommodated in the predetermined accommodating hole 221 as illustrated in FIGS. 3 and 4.

In a case where the number of the resin tablets T to be accommodated in one accommodating hole 221 is set to one, the controller Ctr may control the drive source D1 to rotate the disposition portion 220 by a predetermined angle in the circumferential direction such that the accommodating hole 221 into which the resin tablet T is to be put next corresponds to a release position of the resin tablet T by the gripping mechanism 230. On the other hand, in a case where the number of the resin tablets T to be accommodated in one accommodating hole 221 is set to a plurality, after the predetermined number of resin tablets T are accommodated in the one accommodating hole 221, the controller Ctr may control the drive source D1 to rotate the disposition portion 220 by a predetermined angle in the circumferential direction such that the accommodating hole 221 into which the resin tablet T is to be put next corresponds to the release position. By repeating this operation a plurality of times, a predetermined number of resin tablets T are put into every accommodating hole 221 (see step S13 in FIG. 11).

Figure 11:
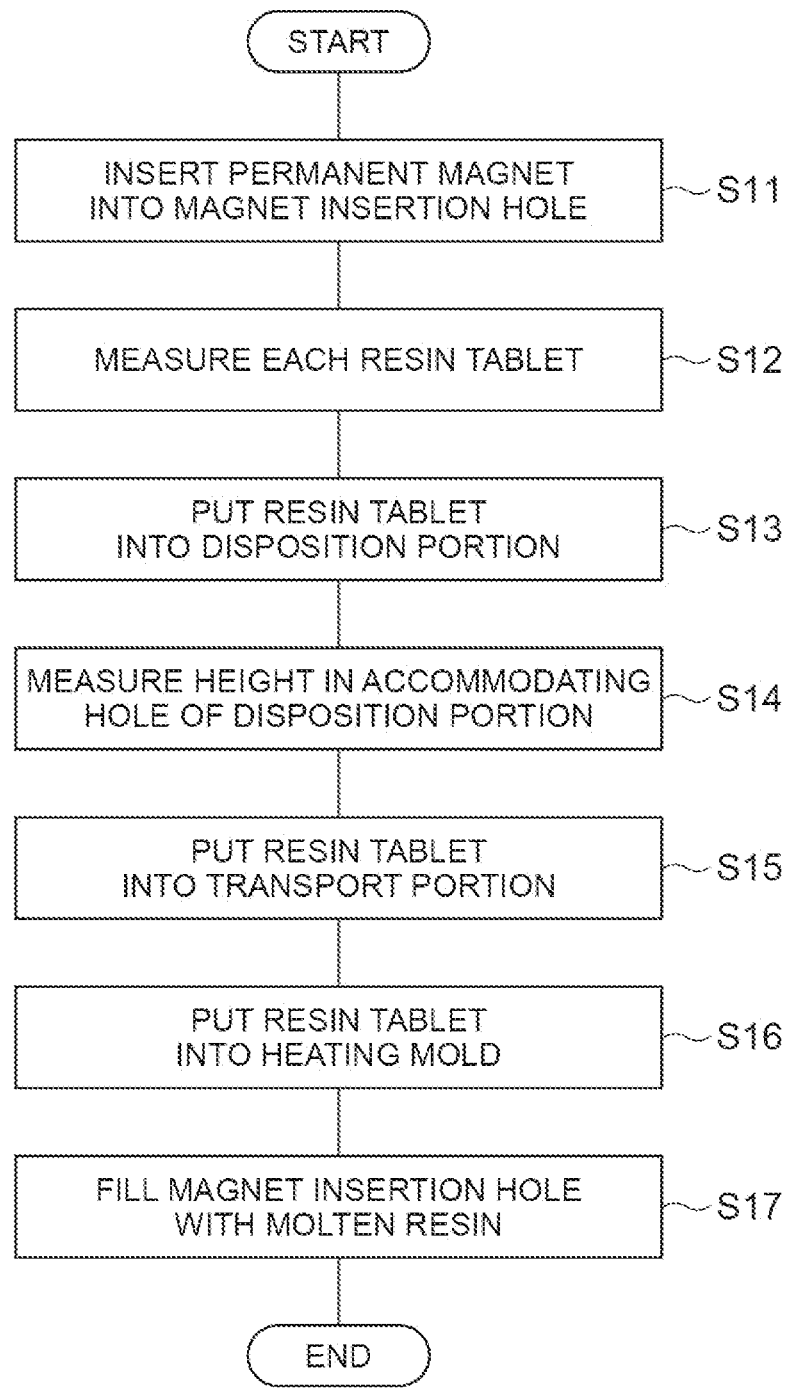
FIG. 11 is a flowchart for describing a method of producing a stacked rotor core.

As illustrated in FIG. 3, the height sensor SE3 may measure the height in the accommodating hole 221 after a predetermined number of resin tablets T are put in for each rotation of the disposition portion 220 and transmit the measurement data to the controller Ctr (see step S14 in FIG. 11). The controller Ctr may determine whether or not a specified number of resin tablets T are in the accommodating hole 221 based on the measured data.

In a case where the height in the accommodating hole 221 is not within a predetermined range, the controller Ctr may issue an alarm to the worker. Alternatively, in a case where the resin tablet T in the accommodating hole 221 is insufficient (in a case where the height in the accommodating hole 221 is less than the lower limit value of the predetermined range), the controller Ctr may control the drive source 232 to additionally put the shortfall of the resin tablet T into the accommodating hole 221. In a case where the resin tablet T in the accommodating hole 221 is excessive (in a case where the height in the accommodating hole 221 exceeds the upper limit value of the predetermined range), the controller Ctr may control the drive source 232 to remove the excess resin tablet T from the accommodating hole 221.

Next, as illustrated in FIG. 5, the controller Ctr controls the drive sources D3 and D4 to position the transport portion 240 above the disposition portion 220 and position the opening-closing member 250 at the first position. In this state, the controller Ctr causes the resin tablets T in the accommodating holes 221 to be respectively put into the corresponding accommodating holes 241 by controlling each lifting-lowering mechanism D2 and lifting each tip portion D2a. Next, the controller Ctr controls the drive source D4 to position the opening-closing member 250 at the second position. Next, the controller Ctr controls each lifting-lowering mechanism D2 to lower each tip portion D2a. As a result, the resin tablet T in each accommodating hole 241 is held by the transport portion 240 and the opening-closing member 250 (see step S15 in FIG. 11).

Next, as illustrated in FIGS. 7 and 8, the controller Ctr controls the drive source D3 to position the transport portion 240 and the opening-closing member 250 above the heating mold 270. At this time, the controller Ctr may control the heater 273 to preheat the heating mold 270 such that the heating mold 270 reaches a predetermined temperature. Next, the controller Ctr controls the drive source D4 to position the opening-closing member 250 at the first position. As a result, the resin tablets T are substantially simultaneously put from the corresponding accommodating holes 241 into the respective temperature-raised accommodating holes 271 (see step S16 in FIG. 11). Accordingly, the heating of the resin tablets T is substantially simultaneously started in the respective accommodating holes 271. The stack 10 may be disposed below the heating mold 270 before the resin tablet T is put into the accommodating hole 271 (before the opening-closing member 250 moves to the first position) so that the resin tablet T is prevented from falling from the accommodating hole 271.

When the resin tablet T is melted into the molten resin M in each accommodating hole 271, the controller Ctr controls each drive source 282 to push out the molten resins M in the accommodating holes 271 into the respective magnet insertion holes 16 by the corresponding plungers 281 (see step S17 in FIG. 11). As a result, each magnet insertion hole 16 is filled with the molten resin M. At this time, the stack 10 may be pressurized by the heating mold 270 and the lower mold 291 or the upper mold 292 and the lower mold 291. When the molten resin M with which each magnet insertion hole 16 is filled solidifies, the heating mold 270 is removed from the stack 10. In this manner, the solidified resin 14 is formed in each magnet insertion hole 16 and the stacked rotor core 1 is completed.

In some examples, the resin tablets T respectively disposed in the accommodating holes 271 start to be heated substantially at the same time. In other words, it is difficult for a time difference to occur between the heating initiation timings of the resin tablets T. Accordingly, the molten resins M in the respective accommodating holes 271 are unlikely to vary in viscosity. Accordingly, the molten resin M is likely to be uniformly supplied to the plurality of magnet insertion holes 16, and thus the generation of a part not filled with the molten resin M in the magnet insertion hole 16, leakage of the molten resin M from the magnet insertion hole 16, and the like are suppressed. Therefore, the molten resin M can be appropriately supplied to the plurality of magnet insertion holes 16. As a result, the defect rate of the stacked rotor core 1 can be reduced.

In some examples, the respective resin tablets T are substantially simultaneously put from the corresponding accommodating holes 241 into the respective temperature-raised accommodating holes 271. Accordingly, there is no need to wait for the input of the resin tablet T from the transport portion 240 to the heating mold 270 until the temperature of the heating mold 270 is completely raised. Accordingly, the productivity of the stacked rotor core 1 can be enhanced.

In some examples, the respective resin tablets T are substantially simultaneously put from the respective accommodating holes 241 into the corresponding accommodating holes 271 by positioning the opening-closing member 250 at the first position. Accordingly, a substantially simultaneous input of the resin tablets T to the accommodating holes 271 can be realized by the extremely simple method of the slide operation of the opening-closing member 250.

In some examples, the accommodating holes 271 are arranged in a circular ring shape. Accordingly, the molten resin M can be more appropriately supplied to the plurality of magnet insertion holes 16 formed in the stack 10 so as to be arranged in a circular ring shape.

In some examples, one or more resin tablets T can be disposed in the accommodating holes 221, 241, and 271. In this case, the molten resin M can be more appropriately supplied by increasing or decreasing the number of the resin tablets T in accordance with the capacity of the magnet insertion hole 16.

In some examples, in the accommodating holes 221, 241, and 271, the plurality of resin tablets T can be arranged in a row in the longitudinal direction thereof. In this case, the molten resin M can be more appropriately supplied even if the capacity of the magnet insertion hole 16 is large. In addition, in a case where the plurality of resin tablets T are arranged in a row in the accommodating hole 271 in the longitudinal direction thereof, the plurality of resin tablets T can be heated substantially uniformly.

In some examples, the height and/or weight of each resin tablet T can be measured by the height sensor SE2 and/or the weight sensor SE1. In this case, whether or not the height and/or weight of each resin tablet T is within a predetermined range is determined in advance by the controller Ctr before the resin tablet T melts. Accordingly, an appropriate amount of molten resin M can be supplied to the magnet insertion hole 16.

In some examples, the height in the accommodating hole 221 after the input of a predetermined number of resin tablets T can be measured. In other words, the height of the resin tablet T accommodated in the accommodating hole 221 can be measured. In this case, whether or not a predetermined number of resin tablets T are disposed in each accommodating hole 221 is determined in advance by the controller Ctr before the resin tablet T melts. Accordingly, an appropriate amount of molten resin M can be supplied to the magnet insertion hole 16.

In some examples, the resin tablets T are put into the accommodating holes 241 of the transport portion 240 after the resin tablets T are respectively put into the accommodating holes 221 of the disposition portion 220. In other words, the processing of disposing the plurality of resin tablets T and the processing of transporting the plurality of resin tablets T to the heating mold 270 are separately performed in the disposition portion 220 and the transport portion 240. Accordingly, the disposition processing, which tends to be relatively time-consuming, can be performed while the plurality of resin tablets T are transported to the heating mold 270 by the transport portion 240. Accordingly, the waiting time for the disposition processing of the plurality of resin tablets T is reduced, and thus the productivity of the stacked rotor core 1 can be enhanced.

In some examples, the resin tablets T are put into the accommodating holes 221 one by one by the gripping jig 231. Even if dust is generated from the resin tablet T due to the gripping of the resin tablet T by the gripping jig 231, the gripping jig 231, which grips the resin tablet T not by adsorption but physically, is relatively unlikely to be affected by the dust. Accordingly, the time and frequency of maintenance work can be reduced, and thus the productivity of the stacked rotor core 1 can be enhanced.

It is to be understood that not all aspects, advantages and features described herein may necessarily be achieved by, or included in, any one particular example. Indeed, having described and illustrated various examples herein, it should be apparent that other examples may be modified in arrangement and detail may be omitted.

In some examples, the heating mold 270 may include two or more accommodating holes 271. In a case where the heating mold 270 includes three or more accommodating holes 271, the accommodating holes 271 may be arranged in an annular shape. The "annular shape" can include a state where three accommodating holes 271 are arranged in a triangular shape, a state where four accommodating holes 271 are arranged in a quadrangular shape, a state where five accommodating holes 271 are arranged in a pentagonal shape, and the like. The transport portion 240 may also include two or more accommodating holes 241 as in the case of the heating mold 270. The disposition portion 220 may also include two or more accommodating holes 221 as in the case of the heating mold 270.

In some examples, the filling of the magnet insertion hole 16 with the molten resin M may be performed in two or more divided steps. In this case, the sizes and/or materials of the resin tablets T used in the respective filling steps may be the same or different. For example, depending on the type of the filler that is contained in the resin tablet T, the fluidity of the molten resin M that is filled first may be set to be lower than the fluidity of the molten resin M that is filled later.

In some examples, in a case where a plurality of the resin tablets T are accommodated in one accommodating hole 221, 241, or 271, the sizes and/or materials of the resin tablets T may be the same or different.

In some examples, the accommodating holes 221, 241, and 271 may accommodate liquid and powder resin materials as well as a solid resin material.

In some examples, the opening-closing member 250 may be disposed in the bottom portion of the disposition portion 220 so as to be horizontally movable with respect to the lower surface of the disposition portion 220. In this case, the resin tablet T in the accommodating hole 221 may be put into the accommodating hole 241 by horizontally sliding the opening-closing member 250 on the bottom surface of the disposition portion 220 in a state where the transport portion 240 is positioned below the disposition portion 220.

In some examples, the filling with the molten resin M may be performed from below the stack as well as from above the stack 10. Alternatively, in some examples, the filling with the molten resin M may be performed from both above and below the stack 10.

Figure 12:
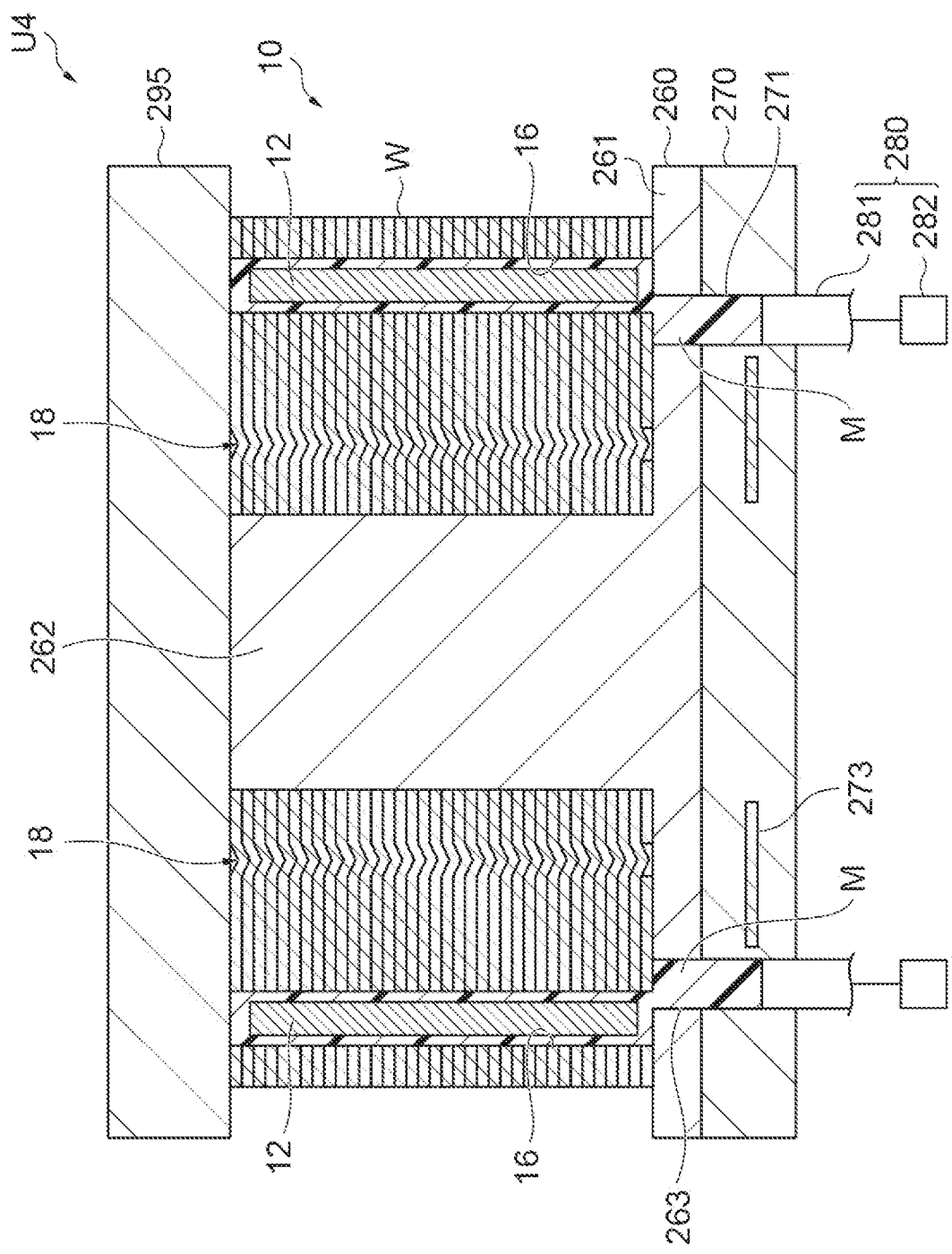
FIG. 12 is a cross-sectional view schematically illustrating another example resin filling system.

An example of the configuration of the heating unit U4 in a case where the filling with the molten resin M is performed from below the stack 10 will be described with reference to FIG. 12. The heating unit U4 exemplified in FIG. 12 is different from the heating unit U4 exemplified in FIG. 9 in that an upper mold 295 is further provided, in terms of the disposition of the extrusion mechanism 280, and in terms of the configuration of the jig 260.

The upper mold 295 is configured to be capable of sandwiching the stack 10 and the jig 260 in the height direction together with the heating mold 270. Each of the plungers 281 of the plurality of extrusion mechanisms 280 is configured to be insertable from below with respect to the corresponding accommodating hole 271.

The base member 261 of the jig 260 may include a plurality of through holes 263. The plurality of through holes 263 are formed in the base member 261 so as to extend in the height direction of the base member 261. The plurality of through holes 263 may, for example, extend from the upper end surface to the lower end surface of the base member 261.

The plurality of through holes 263 may be positioned so as to be annular when viewed from above. The plurality of through holes 263 may be positioned so as to be circular ring-shaped when viewed from above. The plurality of through holes 263 may be equal in number to the plurality of accommodating holes 271. In this case, the plurality of through holes 263 may be positioned so as to overlap the plurality of accommodating holes 271 when viewed from above. When the stack 10 is sandwiched between the jig 260 and the heating mold 270, and the upper mold 295, the through holes 263 may be positioned at parts respectively corresponding to the magnet insertion holes 16 of the stack 10. In addition, a plurality of resin flow paths (for example, grooves or through holes) may be included in either the surface facing the surface of the base member 261 of the jig 260 that is in contact with the stack 10 or the surface of the lower mold 270 that is in contact with the jig 260. The resin flow path may fluidly connect the accommodating hole 271, the through hole 263, and the magnet insertion hole 16. In this case, each accommodating hole 271 may not overlap the corresponding magnet insertion hole 16 when viewed from above and, in that case, the plurality of through holes 263 may be larger in number than the plurality of accommodating holes 271.

Next, the processing of putting the resin tablet T into the heating mold 270 (step S16 in FIG. 11) and the processing of filling the magnet insertion hole 16 with the molten resin M (step S17 in FIG. 11) in the heating unit U4 exemplified in FIG. 12 will be described with reference to FIGS. 12 and 13.

Figure 13:
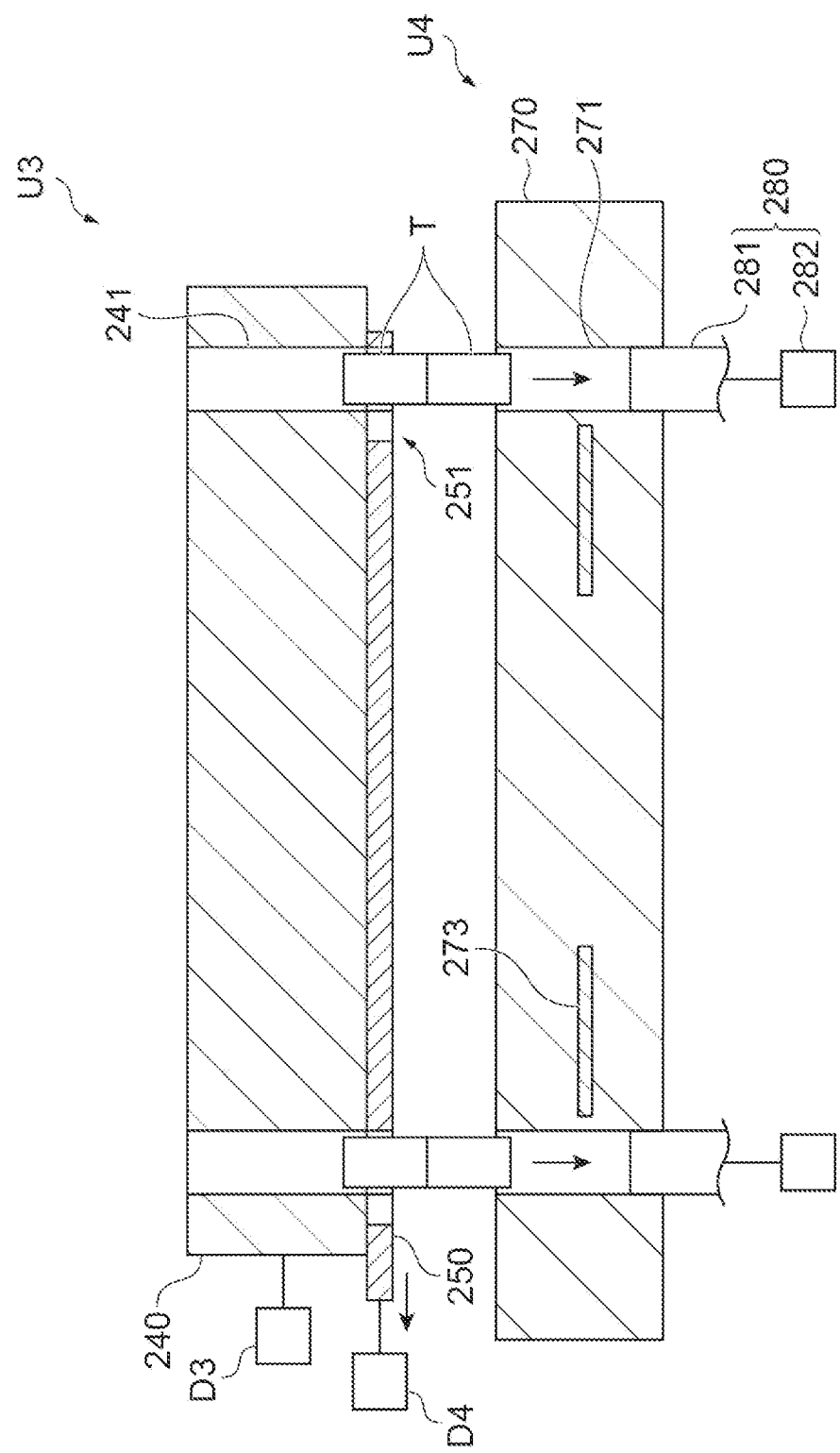
FIG. 13 is a schematic diagram partially illustrating another example resin filling system.

In the processing of putting the resin tablet T into the heating mold 270, as illustrated in FIG. 13, the controller Ctr controls the drive source D3 to position the transport portion 240 and the opening-closing member 250 above the heating mold 270. At this time, the controller Ctr may control the heater 273 to preheat the heating mold 270 such that the heating mold 270 reaches a predetermined temperature. Next, the controller Ctr controls the drive source D4 to position the opening-closing member 250 at the first position. As a result, the respective resin tablets T are substantially simultaneously put from the corresponding accommodating holes 241 into the respective temperature-raised accommodating holes 271 (see step S16 in FIG. 11). Accordingly, the heating of the resin tablets T is substantially simultaneously started in the respective accommodating holes 271. The plungers 281 are respectively inserted from below through the accommodating holes 271, and thus the plunger 281 prevents the resin tablet T from falling.

Next, in the processing of filling the magnet insertion hole 16 with the molten resin M, as illustrated in FIG. 12, the jig 260 where the stack 10 is placed is placed on the heating mold 270. Further, the upper mold 295 is placed on the stack 10. As a result, the stack 10 and the jig 260 are sandwiched by the upper mold 295 and the heating mold 270 in a state where a predetermined load is applied from the height direction. In other words, the heating mold 270 also functions as a lower mold in the heating unit U4 exemplified in FIG. 12.

When the resin tablet T melts into the molten resin M in each accommodating hole 271 in a state where the stack 10 and the jig 260 are sandwiched between the upper mold 295 and the heating mold 270, the controller Ctr controls each drive source 282 to push out the molten resins M in the accommodating holes 271 into the respective magnet insertion holes 16 by the corresponding plungers 281 (see step S17 in FIG. 11). At this time, the stack 10 may be pressurized by the upper mold 295 and the heating mold 270. As a result, the molten resin M flows into each magnet insertion hole 16 through each through hole 263, and thus each magnet insertion hole 16 is filled with the molten resin M. When the molten resin M with which each magnet insertion hole 16 is filled solidifies, the upper mold 295 is removed from the stack 10. In this manner, the solidified resin 14 is formed in each magnet insertion hole 16 and the stacked rotor core 1 is completed.

Figure 14:
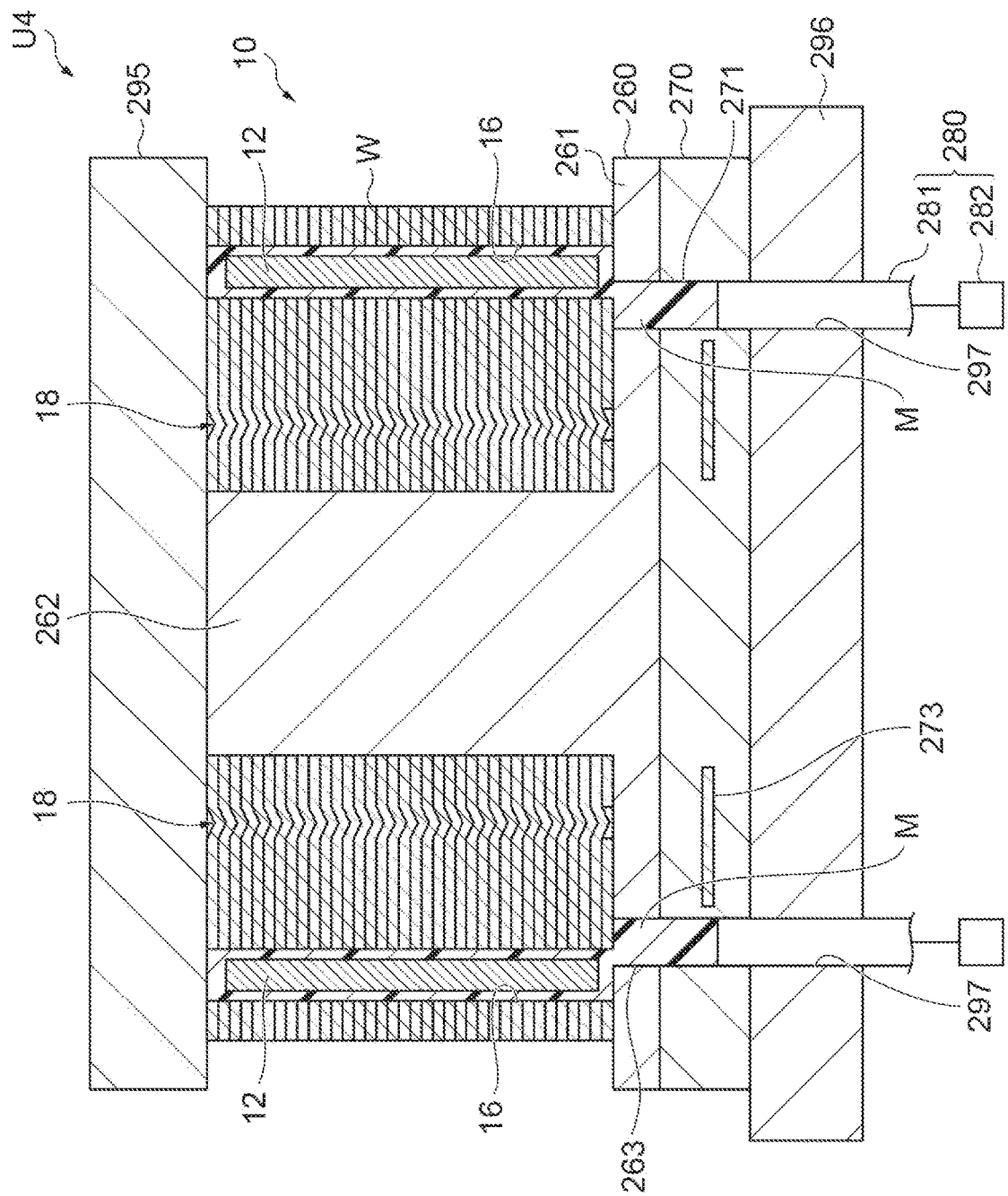
FIG. 14 is a cross-sectional view schematically illustrating another example resin filling system.

Although a case where the heating mold 270 fulfills the function of a lower mold is exemplified here, a lower mold 296 capable of gripping the stack 10, the jig 260, and the heating mold 270 together with the upper mold 295 may be provided separately (see FIG. 14). In this case, a through hole 297 communicating with the accommodating hole 271 may be provided in the lower mold 296 and the extrusion mechanism 280 (plunger 281 and drive source 282) may be provided in each through hole 297. In addition, the lower mold 296 may be integrated with the heating mold 270.

In some examples, the heating mold 270 does not necessarily have to be used. In other words, the method of producing the iron core product includes preheating the stack 10 where the plurality of magnet insertion holes 16 are formed and substantially simultaneously putting the respective resin materials into the plurality of magnet insertion holes 16 from the plurality of accommodating holes 241 formed in the transport portion 240, and the heating of the plurality of resin materials by the heat from the stack 10 may be started substantially at the same time. The magnet insertion hole 16 may be filled with the molten resin M by heating the resin tablet T in a state where the permanent magnet 12 and the resin tablet T are disposed in the magnet insertion hole 16. In this case, the resin tablet T may be heated by heating the stack 10 or the resin tablet T may be heated by inserting the permanent magnet 12 that is heated into the magnet insertion hole 16. In this example, the resin tablets T accommodated in the accommodating holes 241 of the transport portion 240 are respectively and directly put into the corresponding magnet insertion holes 16 instead of the heating mold 270. In a case where the heat of the stack 10 is insufficient, a heating device such as a heater may be disposed around the stack to perform additional heating. In addition, the resin tablet T may be heated by the heat of the stack 10 that is heated and the permanent magnet 12 that is pre-disposed in the magnet insertion hole 16 or by substantially simultaneously inserting the heated permanent magnets 12 into the magnet insertion holes 16 of the heated stack 10 after the resin tablet is inserted. By using the heated permanent magnet 12, the resin material can be cured faster than in the case of using only the heat of the stack 10. In addition, the resin material can be cured faster and production can be expedited by heating the resin material from the outside and the inside. Since the respective resin materials are substantially simultaneously put into the plurality of magnet insertion holes 16, it is difficult for a time difference to occur between the heating initiation timings of the plurality of resin materials. Accordingly, the generation of a part not filled with the molten resin in the magnet insertion hole 16, molten resin leakage from the magnet insertion hole 16, and the like are suppressed. Further, since the heating mold 270 that heats a resin material is unnecessary, the apparatus can be simple, the apparatus is excellent in cost and maintainability, and unnecessary resin generation can be suppressed as no resin flow path is necessary.

Figure 15:
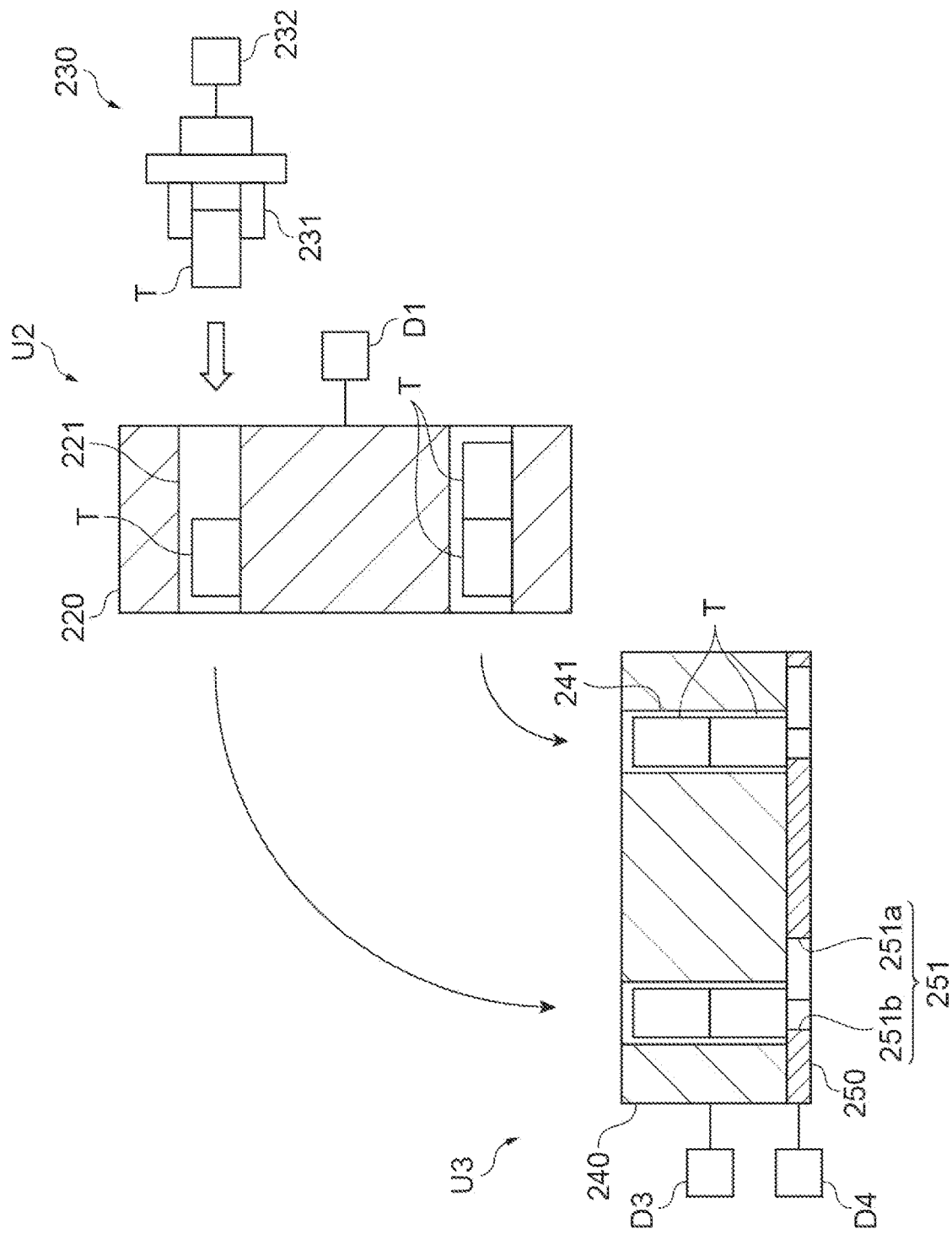
FIG. 15 is a cross-sectional view illustrating another example disposition portion and another example transport portion.

In some examples, as exemplified in FIG. 15, the resin tablets T may be respectively put into the respective accommodating holes 221 by the gripping mechanism 230 moving to the position corresponding to each accommodating hole 221 in a state where the disposition portion 220 is upright (state where the accommodating hole 221 extends in the lateral direction). The disposition portion 220 may be rotated by a predetermined angle in the circumferential direction so as to correspond to a release position of the resin tablet T by the gripping mechanism 230. Meanwhile, in a case where the number of the resin tablets T to be accommodated in one accommodating hole 221 is set to a plurality, after the predetermined number of resin tablets T are accommodated in the one accommodating hole 221, the controller Ctr may control the drive source D1 to rotate the disposition portion 220 by a predetermined angle in the circumferential direction such that the accommodating hole 221 into which the resin tablet T is to be put next corresponds to the release position. By repeating this operation a plurality of times, a predetermined number of resin tablets T are put into every accommodating hole 221. Subsequently, the resin tablets T may be respectively put from the respective accommodating holes 221 into the corresponding accommodating holes 241 by the disposition portion 220 rotating by approximately 90° toward the transport portion 240. The example illustrated in FIG. 15 may also be applied in a case where the resin tablet T is put into the heating mold 270 from the transport portion 240.

Figure 16:
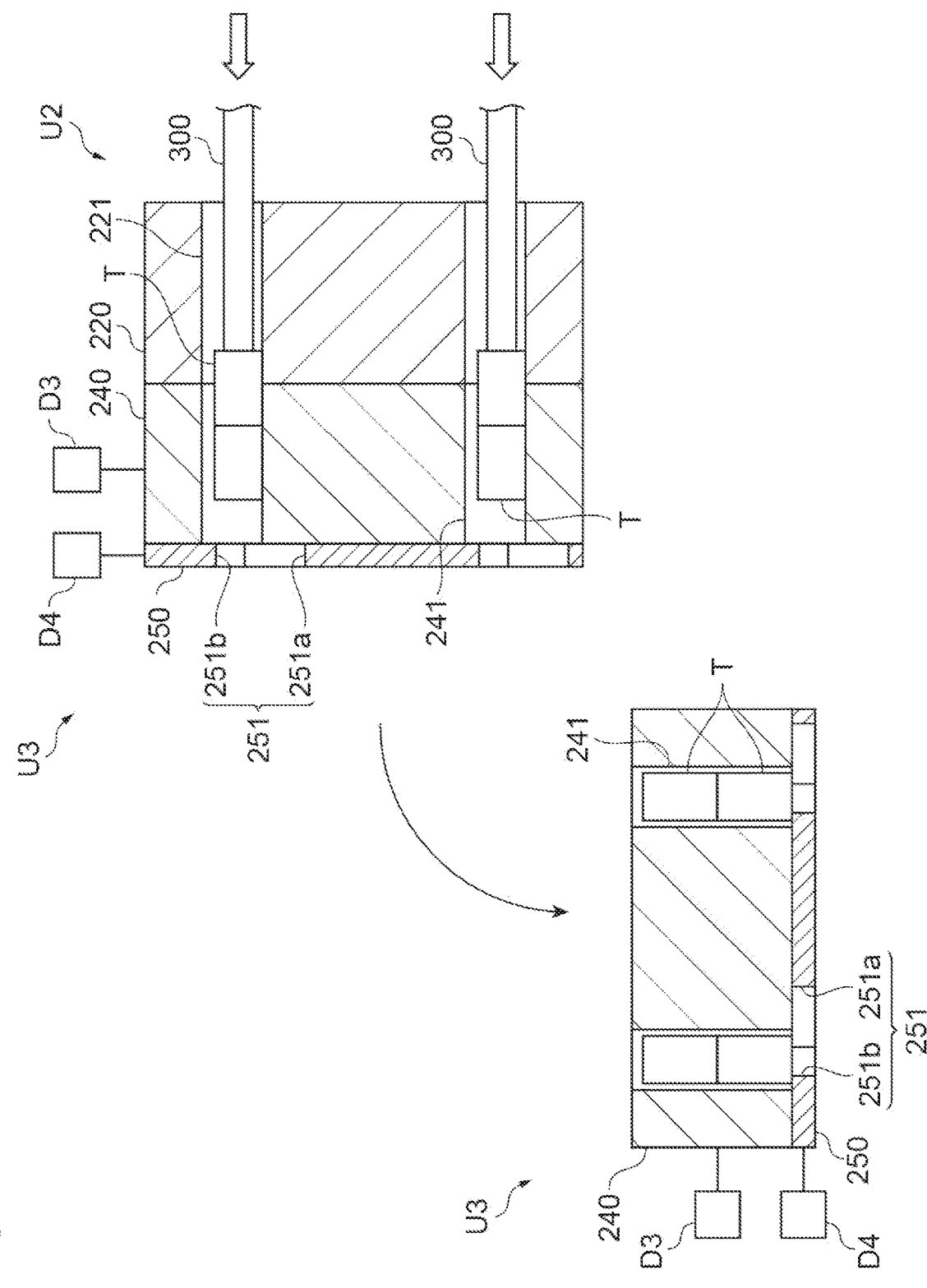
FIG. 16 is a cross-sectional view illustrating another example disposition portion and another example transport portion.

In some examples, as exemplified in FIG. 16, the resin tablet T may be put in with the disposition portion 220 upright (the accommodating hole 221 extending in the lateral direction) and the transport portion 240 upright (the accommodating hole 241 extending in the lateral direction). For example, the resin tablet T disposed in the accommodating hole 221 may be substantially horizontally pushed out into the accommodating hole 241 using a rod-shaped extrusion member 300. Subsequently, the transport portion 240 may be rotated by approximately 90° such that the opening-closing member 250 is positioned on the bottom surface. The transport portion 240 can be moved to the next process simply by rotating the transport portion 240 by approximately 90°, and thus there is an advantage that the configuration of the apparatus is not complicated. The opening-closing member 250 does not have to be operated in inserting the resin tablet T from the disposition portion 220 into the transport portion 240. Accordingly, the resin tablets T can be inserted sequentially as well as simultaneously. In addition, the waiting time until the resin tablet T is inserted into the accommodating hole 221 of the disposition portion 220 can be shortened.

In some examples, the resin tablet T accommodated in each accommodating hole 221 may be preheated with a heater provided in the disposition portion 220. The resin tablet T accommodated in each accommodating hole 241 may be preheated with a heater provided in the transport portion 240.

In some examples, an intermediate plate (not illustrated) may be disposed between the heating mold 270 and the stack 10 when the magnet insertion hole 16 is filled with the molten resin M. The intermediate plate may include a plurality of resin flow paths (for example, grooves or through holes). The resin flow path may fluidly connect the accommodating hole 271 and the magnet insertion hole 16. In this case, each accommodating hole 271 may not overlap the corresponding magnet insertion hole 16 when viewed from above.

In some examples, the resin tablet T may be put into each accommodating hole 271 after the stack 10 and the jig 260 are sandwiched between the heating mold 270 and the lower mold 291.

In some examples, when the stack 10 and the jig 260 are sandwiched between the lower mold 291 and the upper mold 292, power from a drive source or the like may be applied to at least one of the lower mold 291 and the upper mold 292. Power from a drive source or the like may be applied to the heating mold 270.

In some examples, the gripping mechanism 230 may be a robot hand or the like.

In some examples, the resin tablet T may be directly put into each accommodating hole 241 of the transport portion 240 by the gripping mechanism 230. In other words, the transport portion 240 may also serve as the disposition portion 220.

In some examples, the resin tablet T may be directly put into each accommodating hole 271 of the heating mold 270 by the gripping mechanism 230. In other words, the heating mold 270 may also serve as the disposition portion 220 and the transport portion 240. In this case, the heating of the heating mold 270 by the heater 273 may be started after the resin tablet T is put into every accommodating hole 271. The heating mold 270 may move so as to circulate between the disposition unit U2 and the heating unit U4.

Figure 17A:
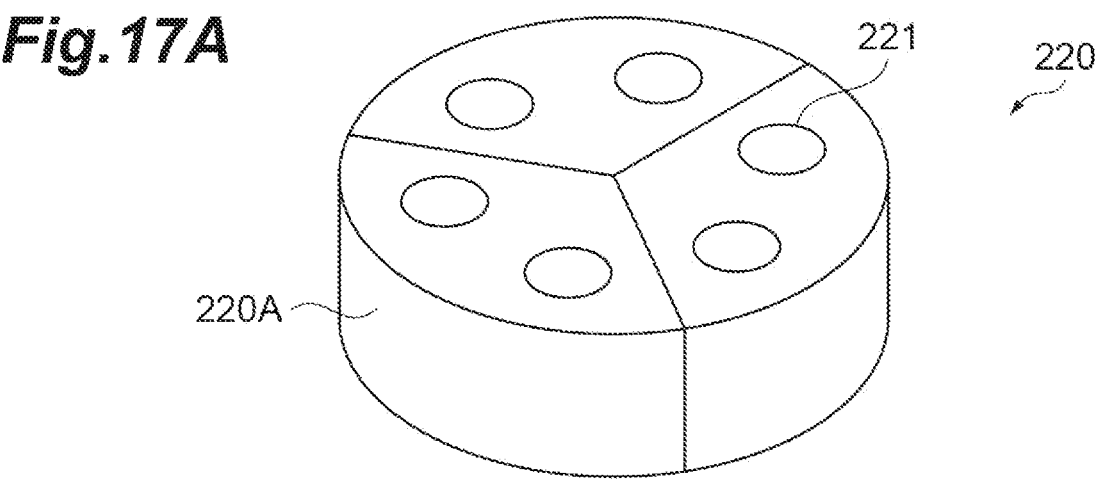
FIG. 17A is a perspective view illustrating another example disposition portion.

In some examples, as exemplified in FIG. 17A, the disposition portion 220 may be configured by a combination of a plurality of members 220A. The member 220A may include at least one accommodating hole 221. When the disposition portion 220 is configured by the combination of the plurality of members 220A, the plurality of accommodating holes 221 may be arranged in an annular shape. The resin tablets T may be respectively put into the transport portion 240 from a plurality of members 240A separately or substantially at the same time.

Figure 17B:
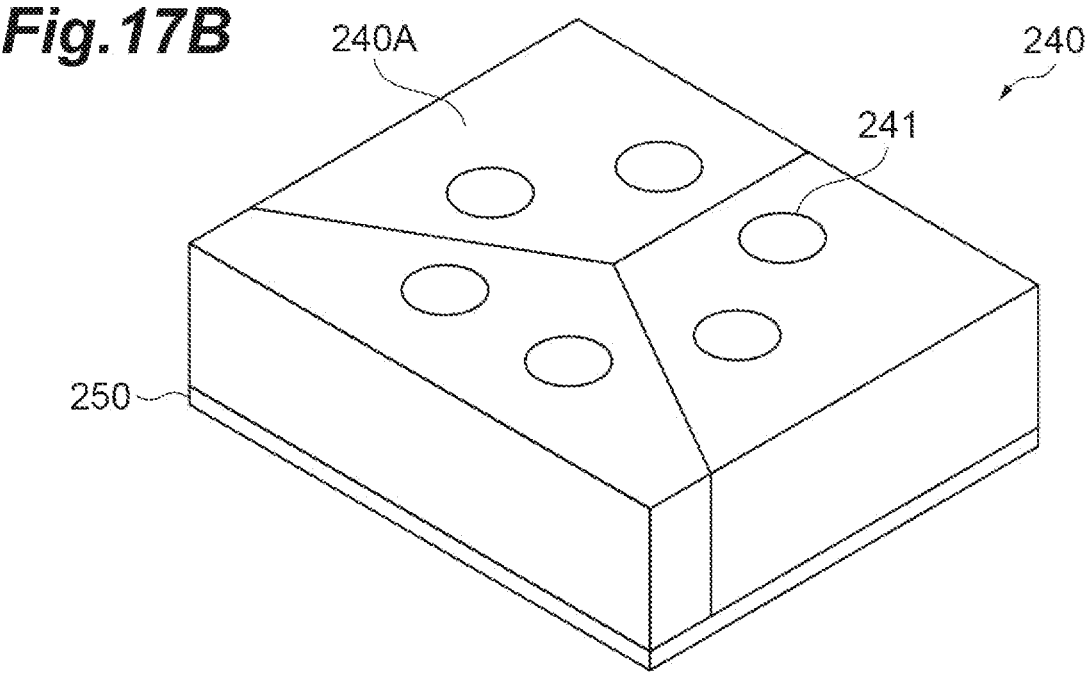
FIG. 17B is a perspective view illustrating another example transport portion.
Figure 17C:
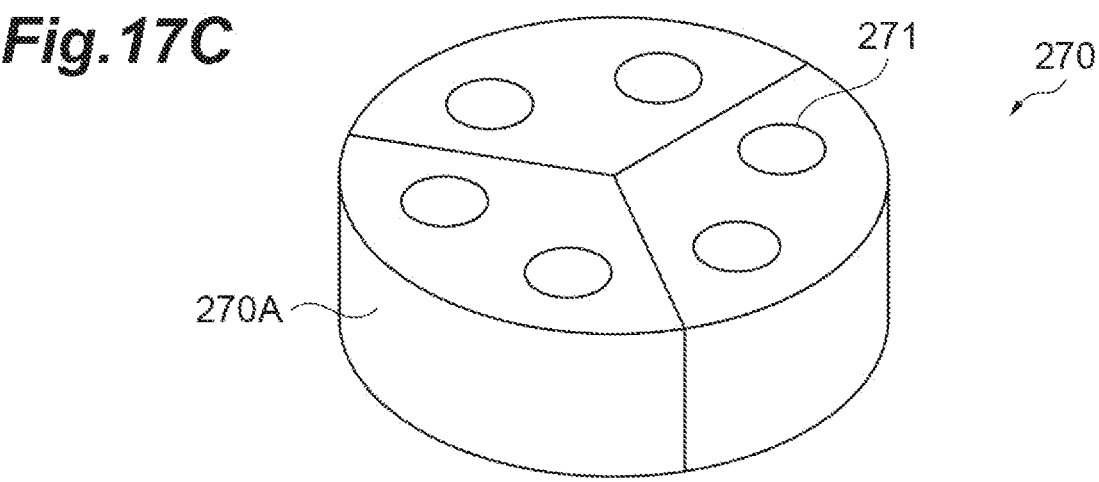
FIG. 17C is a perspective view illustrating another example heating portion.

As exemplified in FIG. 17B, the transport portion 240 may also be configured by a combination of the plurality of members 240A. As exemplified in FIG. 17C, the heating mold 270 may also be configured by a combination of a plurality of members 270A.

Figure 18A:
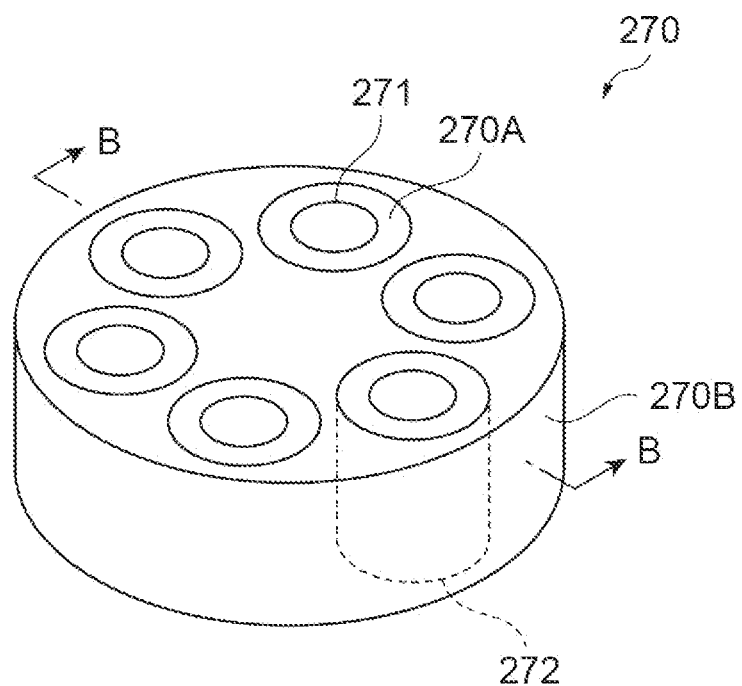
FIG. 18A is a perspective view illustrating another example heating portion.
Figure 18B:
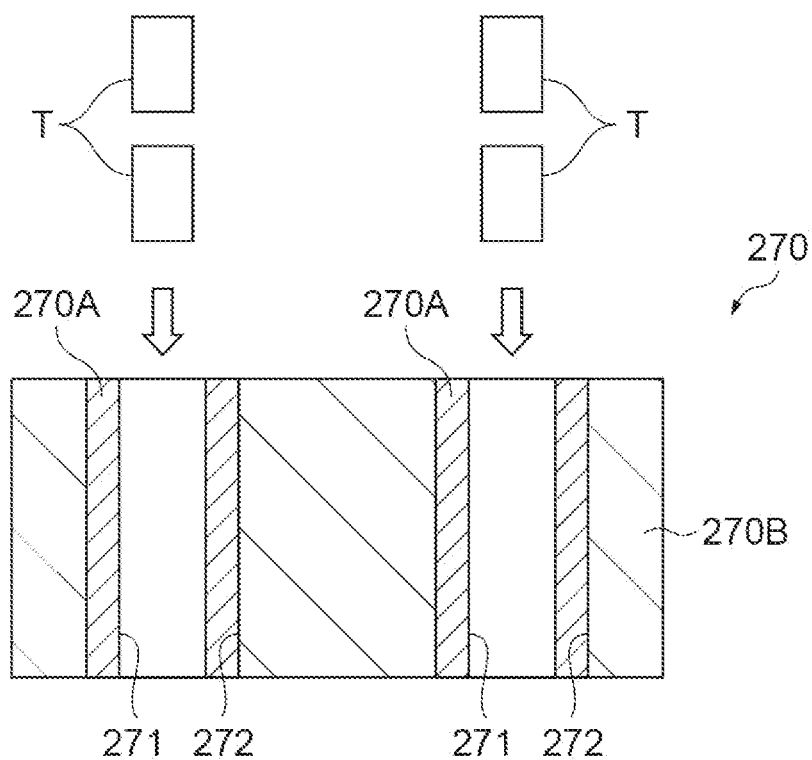
FIG. 18B is a cross-sectional view taken along line B-B of FIG. 18A.

In some examples, as illustrated in FIG. 18A and FIG. 18B, the heating mold 270 may be configured by the plurality of members 270A and a main body member 270B. Each member 270A may be a tubular member where at least one accommodating hole 271 is formed. The main body member 270B may include a holding space 272 where the plurality of members 270A are held. The holding space 272 may be a through hole, a recessed portion, or the like that has a shape corresponding to the outer shape of the plurality of members 270A.

In some examples, the disposition portion 220 may include an accommodating portion capable of accommodating the resin tablet T in place of or in addition to the accommodating hole 221. The transport portion 240 may include an accommodating portion capable of accommodating the resin tablet T in place of or in addition to the accommodating hole 241. The heating mold 270 may include an accommodating portion capable of accommodating the resin tablet T in place of or in addition to the accommodating hole 271. These accommodating portions may be through holes, non-through holes (recessed portions), or different in shape.

In some examples, the number of the resin tablets T disposed in the accommodating hole 241 may be determined by measuring the height of the resin tablet T disposed in the accommodating hole 241. Alternatively, the height of the resin tablet T disposed in the accommodating portion of a pot different from the disposition portion 220 and the transport portion 240 may be measured to determine the number of the resin tablets T disposed in the accommodating portion.

In some examples, the present technique may be applied to an iron core product other than the stacked rotor core 1. The iron core product may be, for example, a stacked stator core, a non-stacked stator core, or a non-stacked rotor core. The stator core may be a split stator core configured by a combination of a plurality of core pieces or may be a non-split stator core. A plurality of the blanked members W that are circular ring-shaped may be stacked in the non-split stacked stator core. Alternatively, in the stacked stator core, a plurality of folding-type blanked members including one yoke provided with a plurality of teeth and having an annular shape by being folded between the teeth may be stacked. The non-stacked rotor core or non-stacked stator core may be a core in which ferromagnetic powder is compression-molded or may be a core in which a ferromagnetic powder-containing resin material is injection-molded.

In some examples, the present technique may be applied to a method of producing an iron core product, the method including a step of filling a resin injection portion (for example, a through hole or a groove) extending in the height direction with the molten resin M. For example, the present technique may be applied when a resin film for insulation between a stator iron core and a winding is provided on the inner peripheral surface of a slot of a stator core. Alternatively, the present technique may be applied in bonding the plurality of blanked members W.

In some examples, the plurality of permanent magnets 12 may be inserted into one magnet insertion hole 16. In this case, the plurality of permanent magnets 12 may be arranged adjacent to each other along the stacking direction in one magnet insertion hole 16 or may be arranged in the longitudinal direction of the magnet insertion hole 16.

An example of a method of producing an iron core product may include: substantially simultaneously putting a resin material into a plurality of first accommodating portions formed in a heating mold; substantially simultaneously initiating heating, by the heating mold, of a plurality of the resin materials disposed in the plurality of first accommodating portions; and supplying a molten resin from the plurality of first accommodating portions to a plurality of resin forming regions provided in a core body. In general, the viscosity of a molten resin tends to increase with heating time. However, in the case of Example 1, the respective resin materials are substantially simultaneously put into the plurality of first accommodating portions, and thus it is difficult for a time difference to occur between the heating initiation timings of the plurality of resin materials. Accordingly, the respective molten resins in the plurality of first accommodating portions are unlikely to vary in viscosity. Therefore, the molten resin from the plurality of first accommodating portions is likely to be uniformly supplied to the plurality of resin forming regions of the core body, and thus the generation of a part not filled with the molten resin in the resin forming region, molten resin leakage from the resin forming region, and the like are suppressed. As a result, the molten resin can be appropriately supplied to the plurality of resin forming regions of the core body.

In some examples, the plurality of first accommodating portions may include three or more first accommodating portions formed in the heating mold so as to be arranged in a circular ring shape. In this case, the molten resin can be more appropriately supplied to the plurality of resin forming regions formed in the core body so as to be arranged in a circular ring shape.

In some examples, each of the plurality of resin materials may be configured to include at least one resin tablet. In this case, the molten resin can be more appropriately supplied by increasing or decreasing the number of the resin tablets in accordance with the capacity of each resin forming region.

An example method may further include measuring a height of each of the plurality of resin materials to determine the number of resin tablets by which each of the resin materials is configured before substantially simultaneously initiating heating of the plurality of resin materials. In this case, whether or not a predetermined number of resin tablets are disposed in each first accommodating portion is determined in advance before the resin tablet melts. Accordingly, an appropriate amount of molten resin can be supplied to the plurality of resin forming regions.

An example method may further include measuring a height and/or weight of each resin tablet by which each of the resin materials is configured before substantially simultaneously initiating heating of the plurality of resin materials. In this case, whether or not the height and/or weight of each resin tablet is within a predetermined range is determined in advance before the resin tablet melts. Accordingly, an appropriate amount of molten resin can be supplied to the plurality of resin forming regions.

In some examples, each of the plurality of resin materials may include a plurality of resin tablets arranged in the first accommodating portion corresponding among the plurality of first accommodating portions and in a row along a longitudinal direction of the first accommodating portion. In this case, the molten resin can be more appropriately supplied even if the capacity of each resin forming region is large. In addition, since the plurality of resin tablets are arranged in a row in each first accommodating portion, the plurality of resin tablets can be heated substantially uniformly.

An example method may further include disposing the resin material with respect to each of a plurality of second accommodating portions formed in a transport portion. Substantially simultaneously putting resin material into the plurality of first accommodating portions may include substantially simultaneously putting the plurality of resin materials disposed in the plurality of second accommodating portions into the plurality of first accommodating portions of the heating mold in a heated state, respectively. In this case, the plurality of resin materials are substantially simultaneously put into the plurality of first accommodating portions of the heating mold that is preheated, and thus waiting time for a rise of the temperature in the heating mold does not arise. Accordingly, the productivity of the iron core product can be enhanced.

In some examples, substantially simultaneously putting the resin material into the plurality of first accommodating portions may include substantially simultaneously opening outlets of the plurality of second accommodating portions from a closed state by operating an opening-closing member disposed in a bottom portion of the transport portion. In this case, a substantially simultaneous input of the plurality of resin materials to the plurality of first accommodating portions can be realized by the extremely simple method of the operation of the opening-closing member.

An example method may further include disposing the resin material with respect to each of a plurality of third accommodating portions formed in a disposition portion. Disposing the resin material with respect to each of the plurality of second accommodating portions may include putting the plurality of resin materials disposed in the plurality of third accommodating portions into the plurality of second accommodating portions, respectively. In this case, the processing of disposing the plurality of resin materials and the processing of transporting the plurality of resin materials to the heating mold are separately performed in the disposition portion and the transport portion. Accordingly, the disposition processing, which tends to be relatively time-consuming, can be performed while the plurality of resin materials are transported to the heating mold by the transport portion. Therefore, the waiting time for the disposition processing of the plurality of resin materials is reduced, and thus the productivity of the iron core product can be enhanced.

In some examples, disposing the resin material with respect to each of the plurality of third accommodating portions may include repeating a plurality of times gripping the resin material with a gripping jig and disposing the gripped resin material in any of the plurality of third accommodating portions. In this case, even if dust is generated from the resin material due to the gripping of the resin material by the gripping jig, the gripping jig is relatively unlikely to be affected by the dust. Accordingly, the time and frequency of maintenance work can be reduced, and thus the productivity of the iron core product can be enhanced.

An example method may further include measuring a height of each of the plurality of resin materials disposed in the plurality of third accommodating portions to determine the number of resin tablets by which each of the resin materials is configured. In this case, the same operation and effects as those of the method of Example 4 can be obtained.

An example apparatus for producing an iron core product may include: a heating mold where a plurality of first accommodating portions are formed; an input machine configured to substantially simultaneously put a resin material into the plurality of first accommodating portions, respectively; a heater configured to substantially simultaneously initiate heating of a plurality of the resin materials disposed in the plurality of first accommodating portions by the input machine; and an extrusion mechanism configured to push out a molten resin in each of the plurality of first accommodating portions and supply the molten resin to a plurality of resin forming regions provided in a core body.

In some examples, the plurality of first accommodating portions may include three or more first accommodating portions formed in the heating mold so as to be arranged in a circular ring shape.

In some examples, each of the plurality of resin materials may be configured to include at least one resin tablet.

An example apparatus may further include a first measuring machine configured to measure the height of each of the plurality of resin materials and a determination unit configured to determine the number of the resin tablets by which each resin material is configured based on the height measured by the first measuring machine.

An example apparatus may further include a second measuring machine configured to measure the height and/or weight of each resin tablet by which each resin material is configured.

In some examples, each of the plurality of resin materials may include a plurality of resin tablets arranged in the first accommodating portion corresponding among the plurality of first accommodating portions and in a row along a longitudinal direction of the first accommodating portion.

In some examples, the input machine may include the transport portion where the plurality of second accommodating portions are formed. The transport portion may be configured to substantially simultaneously put the plurality of resin materials disposed in the plurality of second accommodating portions into the plurality of first accommodating portions of the heating mold that is heated by the heater, respectively.

In some examples, the input machine may further include an opening-closing member disposed in the bottom portion of the transport portion and configured to substantially simultaneously open and close the outlets of the plurality of second accommodating portions. The transport portion may be configured to substantially simultaneously put the plurality of resin materials disposed in the plurality of second accommodating portions respectively into the plurality of first accommodating portions of the heating mold that is heated by the heater by the opening-closing member substantially simultaneously opening the outlets of the plurality of second accommodating portions from a closed state.

An example apparatus may further include a disposition portion where a plurality of third accommodating portions are formed. The disposition portion may be configured to put the plurality of resin materials disposed in the plurality of third accommodating portions into the plurality of second accommodating portions, respectively.

An example apparatus may further include a gripping jig configured to repeat a plurality of times gripping the resin material and disposing the gripped resin material in any of the plurality of third accommodating portions.

An example apparatus may further include a first measuring machine configured to measure the height of each of the plurality of resin materials disposed in the plurality of third accommodating portions and a determination unit configured to determine the number of the resin tablets by which each resin material is configured based on the height measured by the first measuring machine.

We claim all modifications and variations coming within the spirit and scope of the subject matter claimed herein.

We claim:

1. A method of producing an iron core product in a resin filling system including a transport portion, a heating portion, and a jig, the method comprising:
   preheating the heating portion, including a number of first accommodating portions, to a predetermined operating temperature, wherein the number of first accommodating portions are located outside a core body placed on the jig;
   placing resin materials into a number of second accommodating portions formed in the transport portion, wherein each of the number of second accommodating portions contains an equal amount of the resin materials;
   after preheating the heating portion to the operating temperature, transferring the resin materials from the number of second accommodating portions into each of the number of first accommodating portions formed in the heating portion, wherein the number of first accommodating portions equals the number of second accommodating portions formed in the transport portion;
   heating at the predetermined operating temperature, by the heating portion, of the resin materials disposed in the number of first accommodating portions in order to melt the resin materials into a molten resin having a uniform viscosity;
   supplying the molten resin from the number of first accommodating portions to resin forming regions provided in the core body that contain a plurality of magnets; and
   solidifying the molten resin around the plurality of magnets in the resin forming regions of the core body.

2. The method according to claim 1, wherein the number of first accommodating portions include three or more first accommodating portions formed in the heating portion so as to be arranged in a circular ring shape.

3. The method according to claim 1, wherein each of the resin materials includes at least one resin tablet.

4. The method according to claim 3, further comprising measuring a height of each of the resin materials to determine how many resin tablets are included in one resin material, before transferring the resin materials from the number of second accommodating portions into each of the number of first accommodating portions formed in the heating portion.

5. The method according to claim 3, further comprising measuring a height and/or weight of each of the resin tablets included in the resin materials, before transferring the resin materials from the number of second accommodating portions into each of the number of first accommodating portions formed in the heating portion.

6. The method according to claim 3, wherein each of the resin materials includes resin tablets arranged in each of the number of first accommodating portions in a row along a longitudinal direction thereof.

7. The method according to claim 1, wherein transferring the resin materials into the number of first accommodating portions includes simultaneously changing outlets of the number of second accommodating portions from a closed state to an open state by operating an opening-closing member disposed in a bottom portion of the transport portion.

8. The method according to claim 1, further comprising disposing the resin materials in a number of third accommodating portions formed in a disposition portion prior to placing the resin materials into the number of second accommodating portions formed in the transport portion by repeatedly gripping one resin material with a gripping jig and disposing the gripped resin material in any of the number of third accommodating portions.

9. The method according to claim 8, further comprising measuring a height of each of the resin materials disposed in the number of third accommodating portions to determine how many resin tablets are included in one resin material.

10. The method according to claim 1, wherein transferring the resin materials includes concurrently transferring the resin materials into each of the number of first accommodating portions formed in the heating portion.

11. The method according to claim 10, wherein heating the resin materials comprises concurrently heating the resin materials disposed in the number of first accommodating portions so that the molten resin has the uniform viscosity.

12. The method according to claim 1, wherein the core body comprises a stack of blanked members and the heating portion comprises a heating mold.

13. An apparatus for producing an iron core product, comprising:
   a jig configured to hold a core body;
   a heating portion where a number of first accommodating portions are formed, wherein the number of first accommodating portions are located outside the core body placed on the jig;
   a transport portion where a number of second accommodating portions are formed, wherein the number of second accommodating portions equals the number of first accommodating portions formed in the heating portion;
   an input device configured to transfer an equal amount of resin materials from the number of second accommodating portions into each of the number of first accommodating portions;
   a heater configured to initiate heating of the resin materials disposed in the number of first accommodating portions by the input device in order to melt the resin materials into a molten resin having a uniform viscosity, wherein the heating portion is preheated by the heater to a predetermined operating temperature prior to transferring the resin materials from the number of second accommodating portions into the number of first accommodating portions; and
   an extrusion mechanism configured to push out the molten resin in each of the number of first accommodating portions and supply the molten resin to resin forming regions provided in the core body that contain a plurality of magnets, so that the molten resin solidifies around the plurality of magnets.

14. The apparatus according to claim 13, wherein the core body comprises a stack of blanked members and the heating portion comprises a heating mold.

15. The apparatus according to claim 13, wherein the input device is configured to concurrently put the resin materials into each of the number of first accommodating portions.

16. The apparatus according to claim 15, wherein the heater is configured to concurrently heat the resin materials in the number of first accommodating portions to melt the resin materials into the molten resin having the uniform viscosity.

17. The apparatus according to claim 13, wherein the number of first accommodating portions include three or more accommodating portions formed in the heating portion so as to be arranged in a circular ring shape.

18. The apparatus according to claim 13, further comprising:
- a disposition portion in which a plurality of third accommodating portions is formed; and
- a gripping jig configured to grip one or more resin materials and to dispose the gripped resin materials in the plurality of third accommodating portions prior to the resin materials being placed into the number of second accommodating portions formed in the transport portion.

* * * * *